United States Patent [19]

D'Avello et al.

[11] Patent Number: 5,901,357
[45] Date of Patent: May 4, 1999

[54] FREQUENCY ALLOCATION FOR SUBSCRIBERS OF MULTIPLE TELEPHONE SYSTEMS HAVING FREQUENCY SHARING

[75] Inventors: Robert F. D'Avello, Lake Zurich; Robert K. Krolopp, Chicago, both of Ill.

[73] Assignee: Motorola, Inc., Schaumburg, Ill.

[21] Appl. No.: 08/123,597

[22] Filed: Sep. 20, 1993

Related U.S. Application Data

[63] Continuation of application No. 07/832,071, Feb. 6, 1992, abandoned.

[51] Int. Cl.[6] ..................................... H04Q 7/32
[52] U.S. Cl. .................. 455/454; 455/425; 455/426; 455/452; 455/455; 455/552; 455/62; 455/63
[58] Field of Search ........................... 455/62, 73, 74, 455/89, 180.1, 161.3, 422, 425, 426, 444, 448–9, 450–455, 462, 64, 555, 552, 63; 379/61, 59

[56] References Cited

U.S. PATENT DOCUMENTS

| | | | |
|---|---|---|---|
| 4,790,000 | 12/1988 | Kinoshita | 379/59 |
| 4,856,083 | 8/1989 | Makino | 455/166 |
| 4,989,230 | 1/1991 | Gillig et al. | 379/59 |
| 5,044,010 | 8/1991 | Frenkiel et al. | 379/61 |
| 5,119,397 | 6/1992 | Dahlin et al. | 455/32.1 |
| 5,142,691 | 8/1992 | Freeburg et al. | 455/63 X |
| 5,197,093 | 3/1993 | Knuth et al. | 379/61 |
| 5,212,684 | 5/1993 | MacNamee | 455/33.1 |
| 5,276,908 | 1/1994 | Koohgoli et al. | 455/62 X |

FOREIGN PATENT DOCUMENTS

| | | |
|---|---|---|
| 0452290A1 | 10/1991 | European Pat. Off. . |
| WO92/04796 | 3/1992 | WIPO . |

Primary Examiner—Reinhard J. Eisenzopf
Assistant Examiner—Philip J. Sobutka
Attorney, Agent, or Firm—Kevin D. Kaschke

[57] ABSTRACT

A portable radiotelephone (101) cooperatively operates with a cordless base station (115) over the local coverage area using cellular frequency channels. Both the portable radiotelephone (101) and the cordless base station (115) scan the available channels to generate separate priority lists. The portable radiotelephone (101) and the cordless base station (115) categorize the available channels in its own priority list from best to worst. The priority list from both the portable radiotelephone (101) and the cordless base station (115) are combined to form a master priority list. The cordless telephone system then assigns the clearest available channel from the master priority list for use in the cordless telephone system. Thus, interference to and from the cellular system and other users of the cellular frequencies is minimized and the need for frequency planning is eliminated.

61 Claims, 12 Drawing Sheets

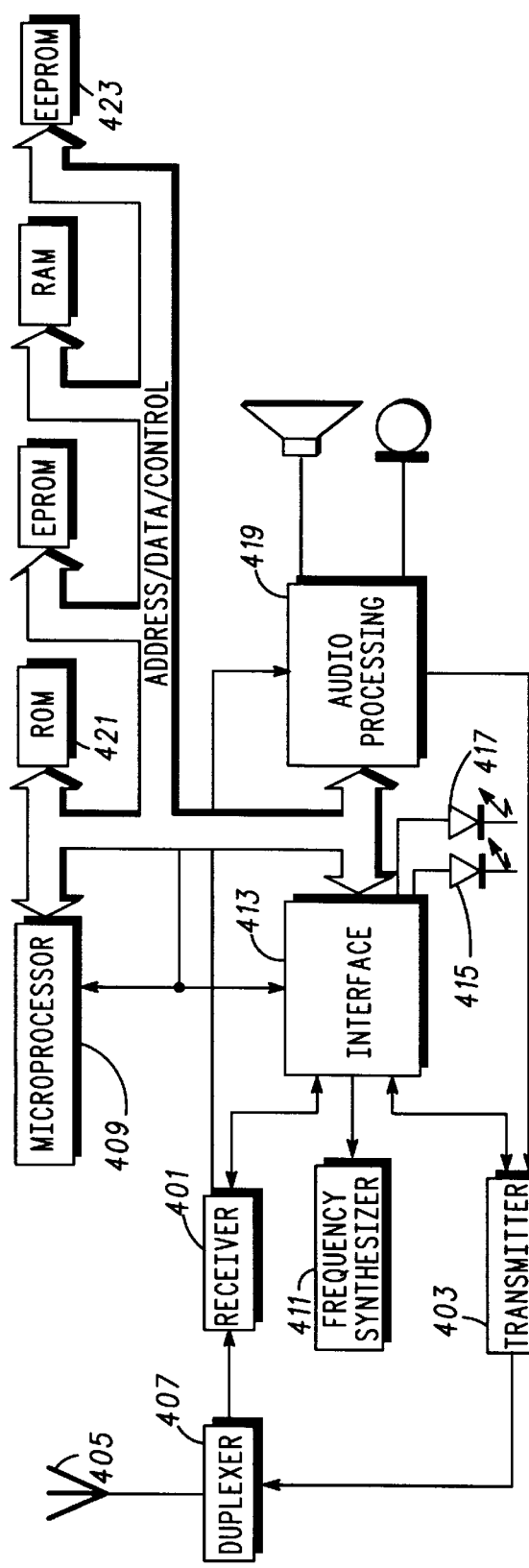
*FIG. 4*
*FIG. 8*
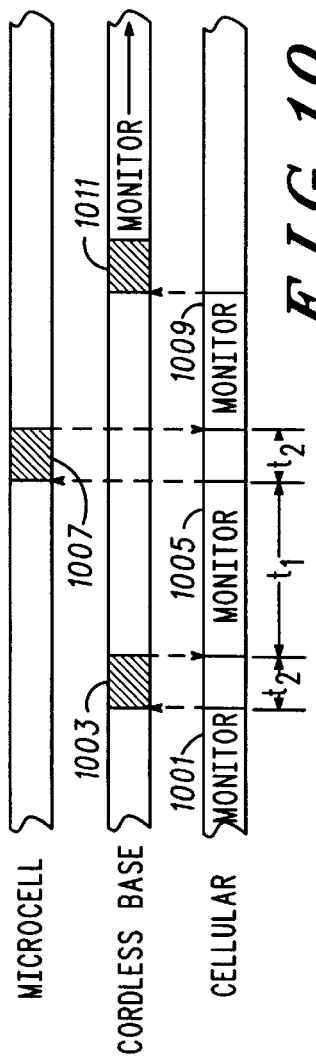
*FIG. 10*

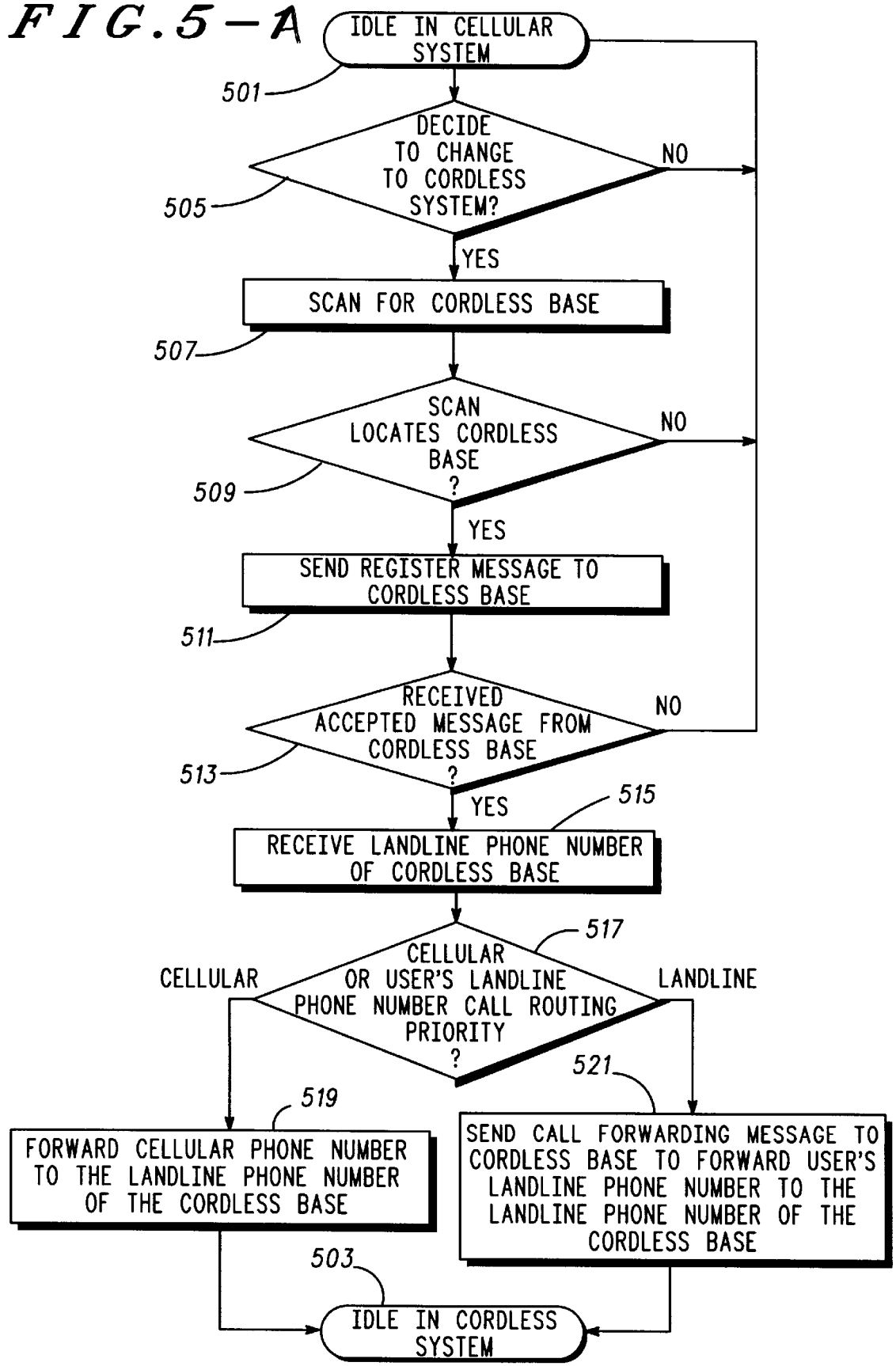

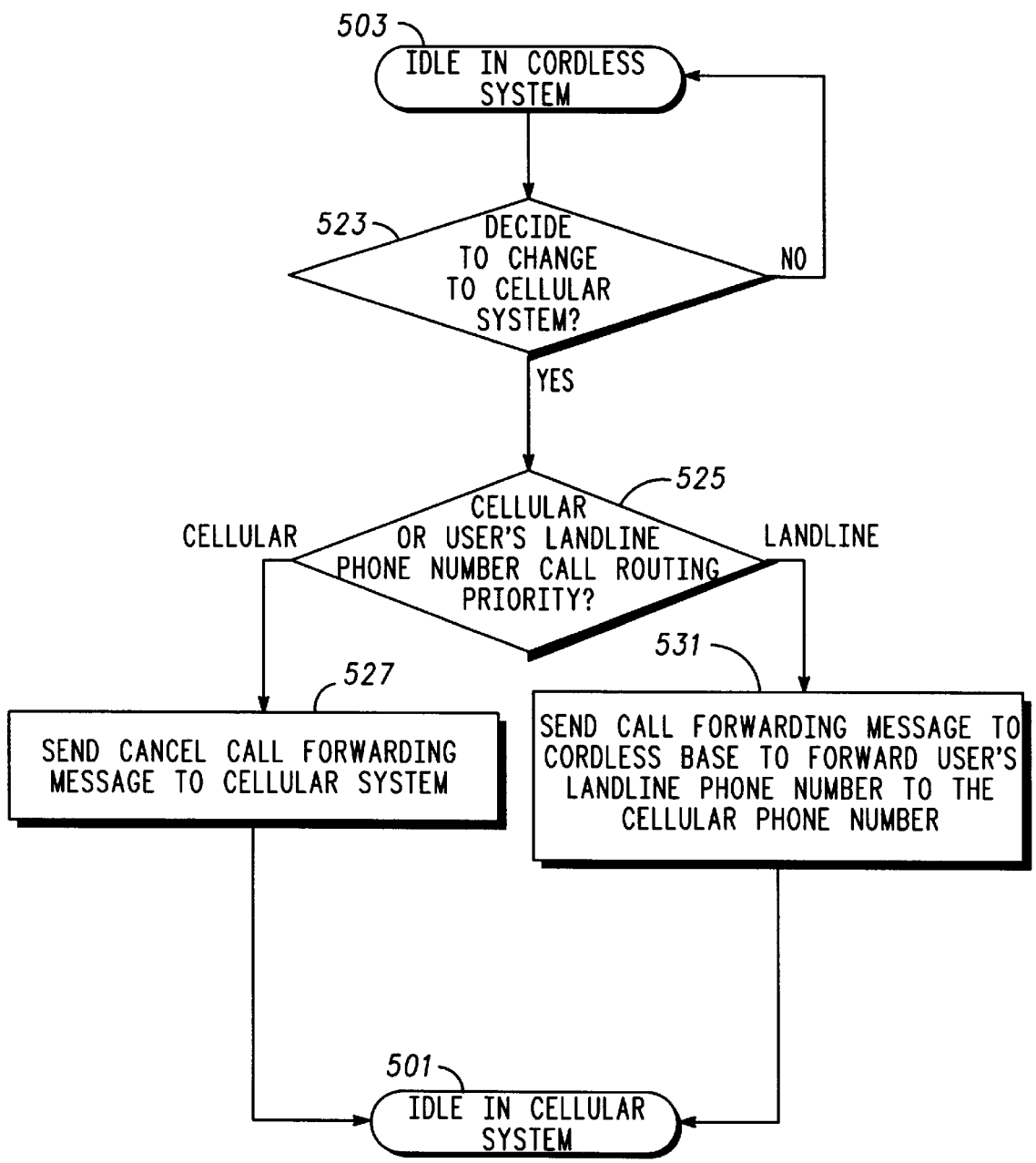
FIG.5-B

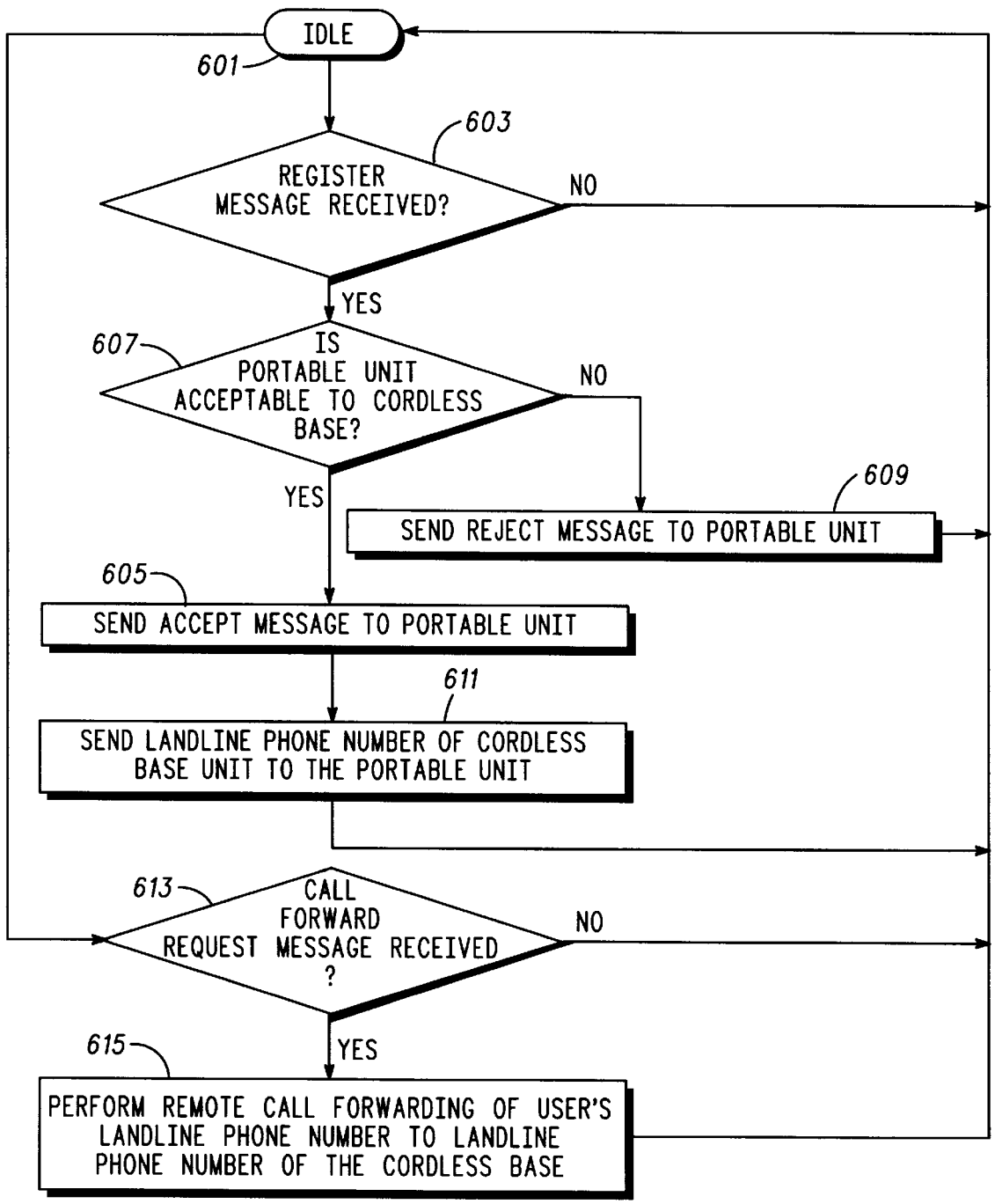
FIG.6-A

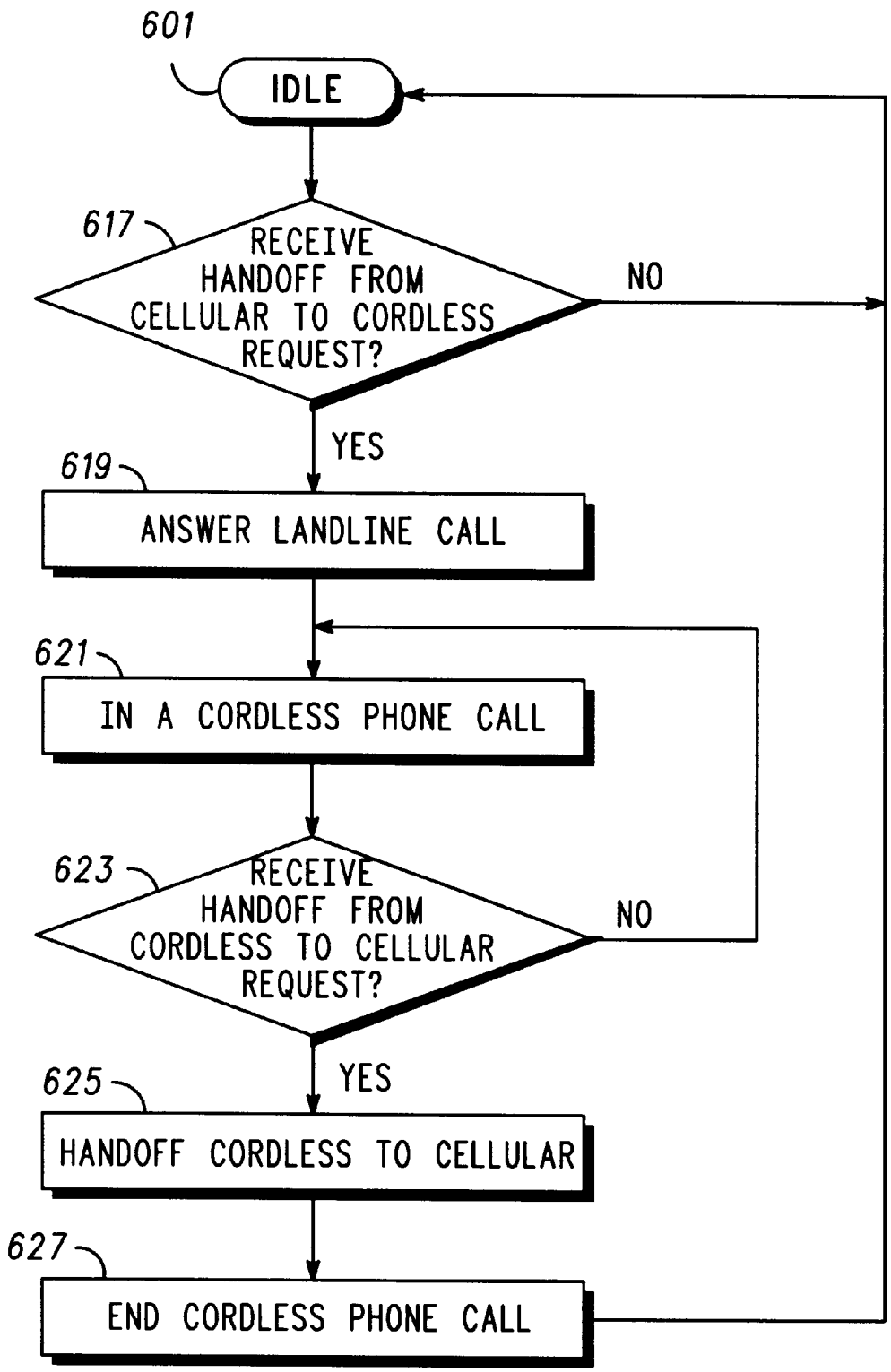
FIG. 6-B

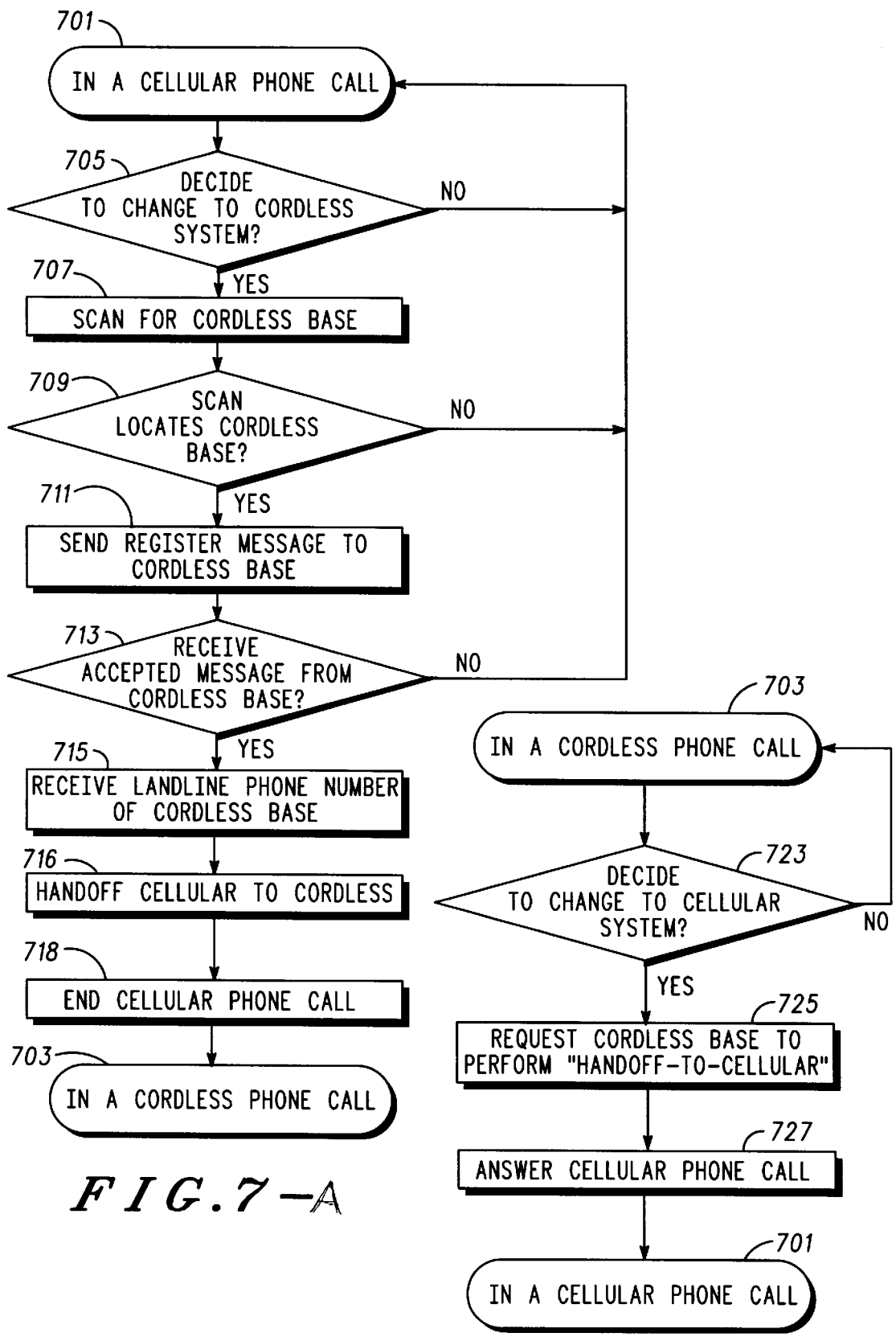
FIG. 7-A
FIG. 7-B

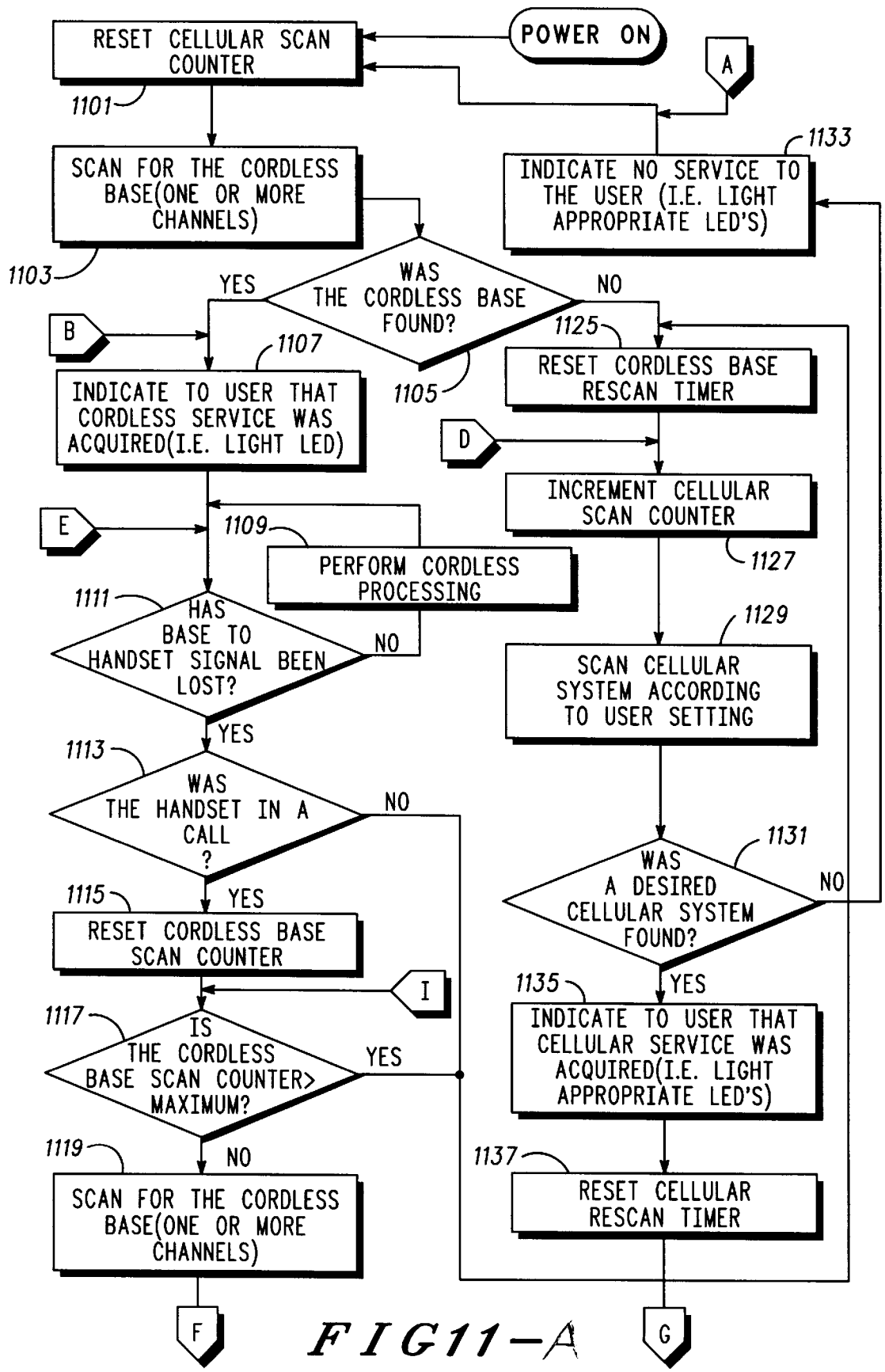
FIG 11-A

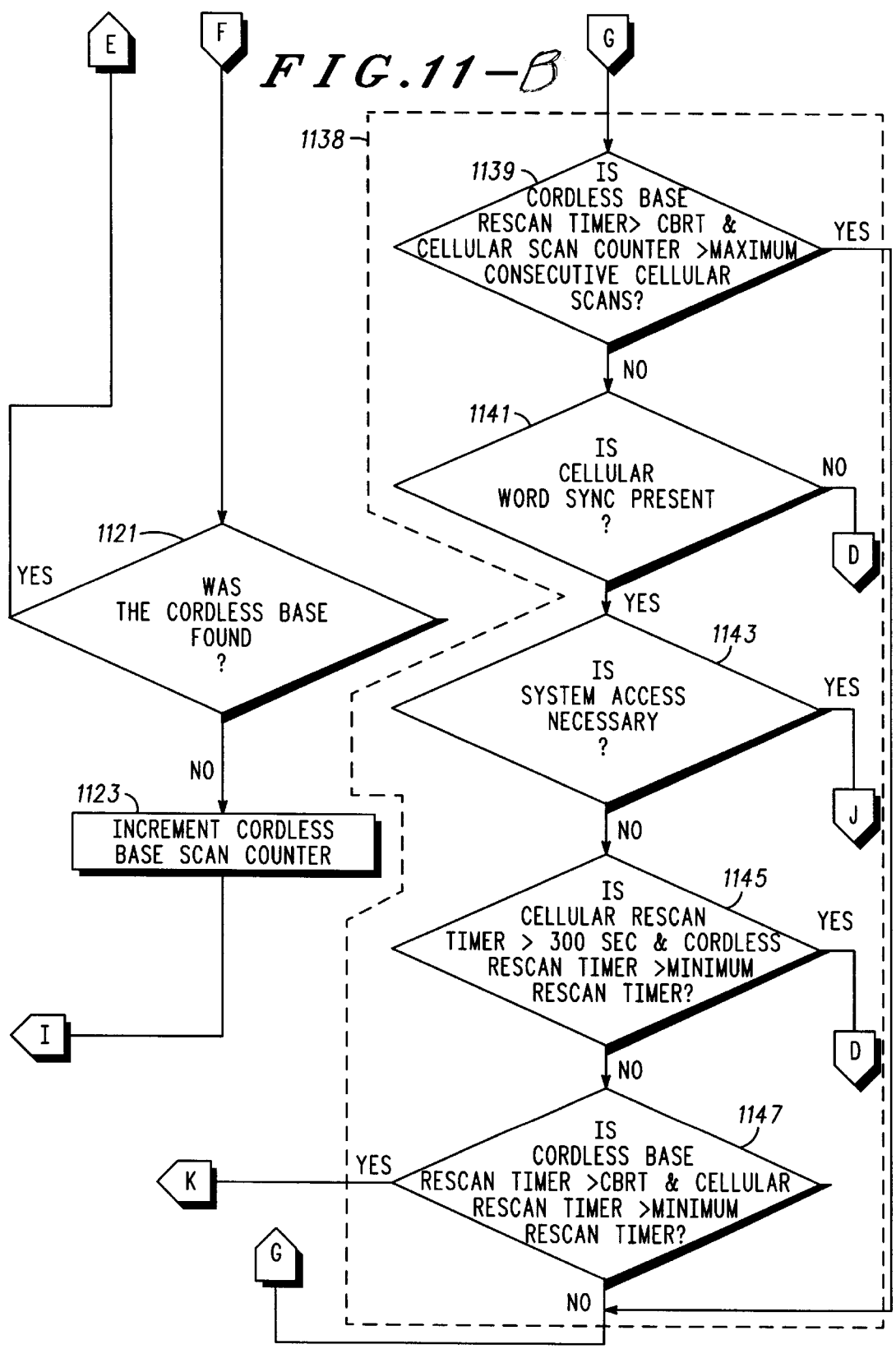
FIG.11-B

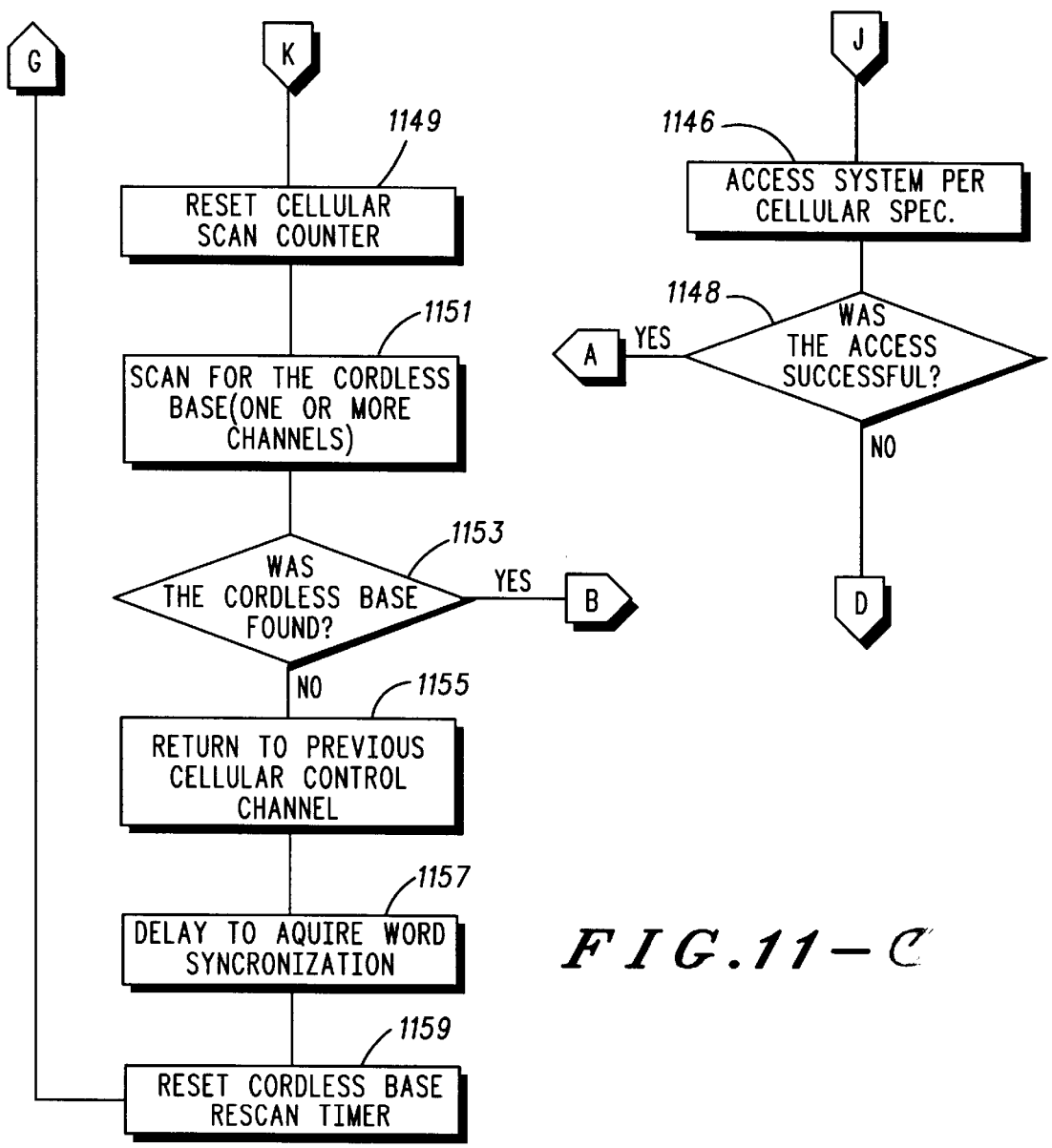
FIG.11-C

FREQUENCY ALLOCATION FOR SUBSCRIBERS OF MULTIPLE TELEPHONE SYSTEMS HAVING FREQUENCY SHARING

This is a continuation of application Ser. No. 07/832,071, filed Feb. 6, 1992 and now abandoned.

FIELD OF THE INVENTION

The present invention relates generally to portable telephones, and more particularly to an improved portable telephone that may receive calls in both cordless and cellular telephone systems.

BACKGROUND OF THE INVENTION

A cordless telephone system typically includes a portable cordless handset and a cordless base station connected to a telephone company phone system (TELCO) by telephone landlines. The cordless base station has an assigned landline telephone number that allows the user to place and receive calls using the cordless portable handset within a limited range of the cordless base station, such as in a home. However, due to their limited range, the cordless portable handset provides the user with relatively local radiotelephone communication.

Radiotelephone communication outside the range of the cordless telephone system may also be provided to the user via a cellular telephone system. A cellular telephone system typically includes cellular subscriber units (mobile or portable) and cellular base stations connected to the TELCO via one or more cellular switching networks. Each cellular subscriber unit has an assigned cellular telephone number that allows the user to place and receive calls within a widespread range of the cellular base stations, such as throughout a metropolitan area. However, the cost of using the cellular telephone service is much greater than the cordless telephone service.

A problem exists for the user that frequently relocates between the cordless and cellular telephone systems. An incoming call routed to the system where the user is not located may be missed. In the prior art, landline and cellular telephone companies have provided a solution to this problem with features known as No Answer Transfer or Call Forwarding or Three Way Calling. No Answer Transfer enables the user to program the system to route an incoming call from the cellular telephone system to the cordless telephone system or visa versa when the user's telephone that was called is not turned on, not answered, or out of range of the base station. Thus, the user may receive an incoming call placed to either the cordless or cellular telephone system.

Some problems exist with the No Answer Transfer feature. The user must manually program the system each time there is a need to activate or deactivate the No Answer Transfer feature. Manually programming the system is a cumbersome task for the user and forgetfulness of the user may result in missed or improperly routed incoming calls. The user must also purchase and operate unique radiotelephone equipment for both the cordless and cellular telephone systems resulting in increased cost and inconvenience to the user.

Additionally, a portable radiotelephone which transmits and receives calls in both a cellular and a cordless system should have the capability to select the clearest available channel for use. An automatic channel selection should minimize interference and eliminate the need for conventional frequency planning.

Furthermore, a portable radiotelephone which transmits and receives calls in both a cellular and a cordless system should have the capability to select which system it is to operate into. An automatic system selection should be made on parameters advantageous to the user. The user should also be able to override the automatic selection and pick a system manually.

Accordingly, there is a need for a radiotelephone system that enables a user to receive incoming calls via both a cordless and cellular telephone system without the imposing inconvenience and expense on the user.

SUMMARY OF THE INVENTION

A radiotelephone apparatus operates in a first radiotelephone system having a first frequency bandwidth including at least a portion of a second frequency bandwidth of a second radiotelephone system. The radiotelephone apparatus tunes to selected frequencies from the first frequency bandwidth. The selected frequencies are categorized. The selected frequencies are prioritized to determine the best frequency for use. The radiotelephone apparatus is tuned to the best frequency to operate in the first radiotelephone system.

BRIEF DESCRIPTION OF THE DRAWINGS

FIG. 4 is a block diagram of a portable radiotelephone which may employ the present invention.

FIGS. 5A and 5B are flowcharts for the process used by the portable radiotelephone of FIG. 4 when the portable radiotelephone is not in a call.

FIG. 6A is a flowchart for the process used by the cordless base station of FIG. 3 when the portable radiotelephone is not in a call.

FIG. 6B is a continuation of the flowchart in FIG. 6A for the process used by the cordless base station of FIG. 3 when the portable radiotelephone is in a call.

FIGS. 7A and 7B are flowcharts for the process used by the portable radiotelephone of FIG. 4 when the portable radiotelephone is in a call.

FIG. 8 is a message stream format which may be transmitted from the cordless base station of FIG. 3.

FIG. 10 is a timing diagram of the system scanning process which may be employed in the portable radiotelephone of FIG. 4.

FIGS. 11A and 11B are, together, a flowchart diagramming the process of system priority selection which may be employed in the portable radiotelephone of FIG. 4.

DETAILED DESCRIPTION OF A PREFERRED EMBODIMENT

Figure 1:
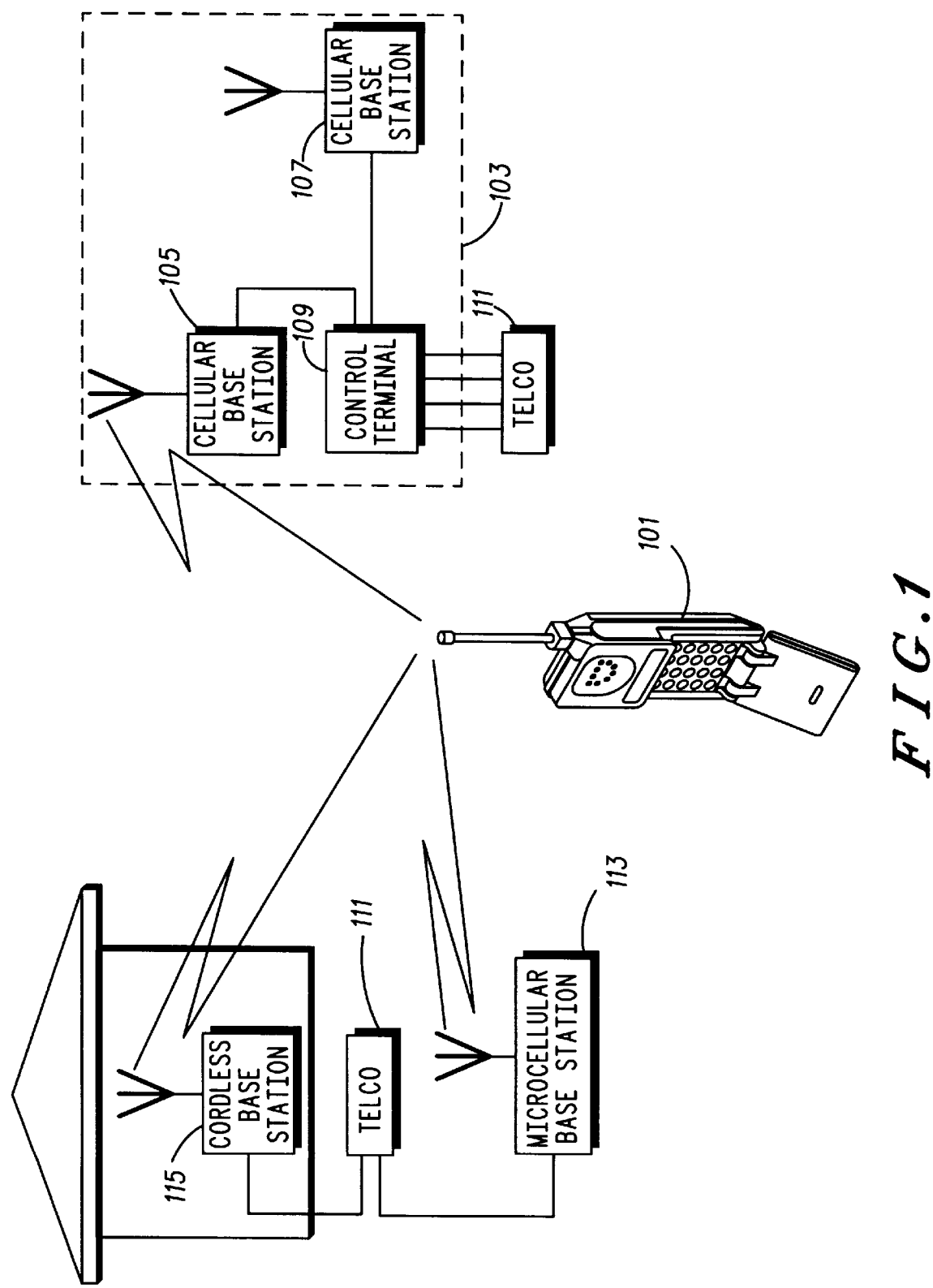
FIG. 1 is a block diagram of an operating configuration for a portable radiotelephone in which several systems, including both a cellular system and a cordless system, may be accessed by the same portable radiotelephone.

A generalized block diagram of an application of the present invention is shown in FIG. 1. A portable cellular cordless (PCC) radiotelephone 101 is shown having the ability to communicate with a conventional cellular radiotelephone system 103, which has a plurality of cellular base stations 105, 107 located at geographically separate locations but arranged to provide radiotelephone coverage over a wide geographic area. The cellular base stations are coupled to a control terminal 109 which provides coordination among the plurality of cellular base stations, including handoff of user cellular mobile and portable equipment, and provides call switching and interconnect to the public switched telephone network (identified hereinafter as "TELCO") 111.

The PCC 101 further has the capacity to communicate with a microcellular base station 113, which is a cellular adjunct cell having lower power and limited capabilities but providing public radiotelephone service to distinct areas such as shopping malls, airports, etc. The microcellular base station 113 is coupled to the TELCO 111 landline telephone system so that calls can be placed to the TELCO.

The PCC 101 further has the capability to communicate with and place radiotelephone calls via a cordless base station 115, which provides private telephone line interconnection to the TELCO 111 for the user of the PCC 101. As previously noted, the cordless base station 115 and the PCC 101 together provide the limited radio range service conventionally known as cordless telephone service. Such service has become pervasive, conventionally using a few radio frequency channels in the HF (high frequency) radio band.

The user of a radiotelephone should expect that radiotelephone service be available wherever he travels in the United States and that this service is provided at the lowest cost. It is also to be expected that radiotelephone service be provided in a portable unit that is as compact and inexpensive as possible. The PCC 101 is uniquely configured to meet this end. Furthermore, the cordless base station 115 is uniquely designed to provide telephone interconnect to the user's home telephone line when the user has the PCC 101 within the radio range of the cordless base station 115.

Figure 2:
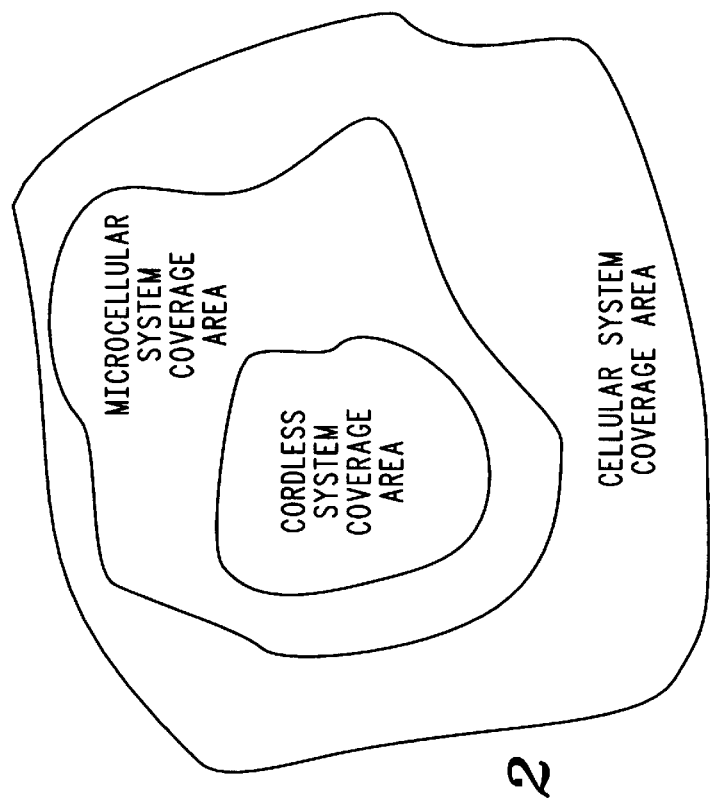
FIG. 2 is a diagrammatical map which shows a typical arrangement of coverage areas for the cordless, microcellular and cellular systems.

FIG. 2 shows a typical arrangement of coverage areas for the cordless, microcellular and cellular systems. The cordless system coverage area is the smallest and resides within the microcellular system. The microcellular system has intermediate coverage and resides within the cellular system. The coverage area of each system may depend upon but is not limited to the number of base stations in each system, antenna height of each base station and the power level used by each system. The user of the portable radiotelephone may relocate between the various coverage areas. The portable radiotelephone may change between systems based on but not limited to portable radiotelephone location, system availability, and user preference.

The coverage areas of the systems are not limited to the particular arrangement as shown in FIG. 2. A coverage area may be independent of another coverage area or may partially overlap one or more other coverage areas.

The cordless base station 115, conceptually, is a subminiature cellular system providing a single signalling channel which transmits outbound data messages in a fashion analogous to a conventional cellular outbound signalling channel, and receives service requests from a remote unit, such as a PCC 101. Proper service requests are granted with an assignment of a voice channel (made via the control channel) on the same or a second radio frequency to which the PCC 101 is instructed to tune for its telephone call.

Figure 3:
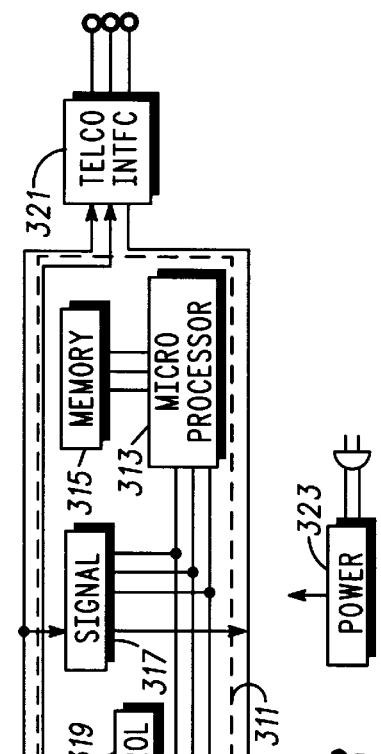
FIG. 3 is a block diagram of a cordless base station which may employ the present invention.

The basic implementation of a cordless base station is shown in FIG. 3. A conventional transmitter 301 and a conventional receiver 303 suitable for use in the 869 to 894 MHz and 824 to 849 MHz band of frequencies, respectively, being used for conventional cellular services, are coupled to a common antenna 305 via a duplexer 307. The power output of the transmitter 301 is limited to approximately 6 milliwatts so that interference to other services and other cordless telephone stations is minimized. The channel frequency selection is implemented by a frequency synthesizer 309 controlled by a logic unit 311. Within the logic unit 511 is a microprocessor 513, such as a 68HC11 available from Motorola, Inc., or similar microprocessor, which is coupled to conventional memory devices 315 which store the microprocessor operating program, base identification (BID) and customizing personality, and other features. Received and transmitted data is encoded/decoded and coupled between the receiver 303, the transmitter 301, and the microprocessor 313 by signalling interface hardware 317. The microprocessor instructions are conveyed and implemented by control hardware 319. Interface with the user's home landline telephone line is conventionally accomplished via a TELCO interface 321. Power is supplied from the conventional AC mains and backed-up with a battery reserve (all depicted as power 323).

The PCC 101 is a portable radiotelephone transceiver which is shown in block diagram form in FIG. 4. A portable radio receiver 401, capable of receiving the band of frequencies between 869 and 894 MHz, and a portable transmitter 403, capable of transmitting with low power (approximately 6 milliwatts in the preferred embodiment) on frequencies between 824 and 849 MHz, are coupled to the antenna 405 of the PCC 101 by way of a duplexer 407. The particular channel of radio frequency to be used by the transmitter 403 and the receiver 401 is determined by the microprocessor 409 and conveyed to the frequency synthesizer 441 via the interface circuit 413. Data signals received by the receiver 410 are decoded and coupled to the microprocessor 409 by the interface circuit 413 and data signals to be transmitted by the transmitter 403 are generated by the microprocessor 409 and formatted by the interface 413 before being transmitted by the transmitter 403. Operational status of the transmitter 403 and the receiver 401 is enabled or disabled by the interface 413. The interface also controls light emitting diodes, 415 and 417, which are used to indicate to the user which system the PCC 101 is currently receiving. Control of user audio, the microphone output and the speaker input, is controlled by audio processing circuitry 419.

In the preferred embodiment, the microprocessor 409 is a 68HC11 microprocessor, available from Motorola, Inc., and performs the necessary processing functions under control of programs stored in conventional ROM 421. Characterizing features of the PCC 101 are stored in EEPROM 423 (which may also be stored in microprocessor on-board EEPROM) and include the number assignment (NAM) required for operation in a conventional cellular system and the base identification (BID) required for operation with the user's own cordless base.

The transmitter 403 of the PCC 101 has the capability of transmitting with the full range of output power which is required for operation in a conventional cellular system. This range of output power consists of six sets of output power magnitude ranging from a high output power level of approximately 600 milliwatts to a low output power level of 6 milliwatts. This six set range of output power is enabled when the PCC 101 is in the cellular system mode.

According to the preferred embodiment of the present invention, the same PCC 101 is compatible with both the cordless and cellular telephone system 103. This is accomplished by enabling the PCC 101 to operate in both a cordless and cellular telephone system 103 using only cellular telephone frequencies. Such a radiotelephone arrangement is further described in copending U.S. patent application Ser. No. {CE00617R}, assigned to the assignee of the present invention and filed on the same date herewith.

The radiotelephone arrangement has desirable advantages for the user. Firstly, the PCC 101, in combination with the cordless base station 115, can automatically route an incoming call to the telephone system in which the PCC 101 is located without inconveniencing the user. Secondly, the PCC 101, in combination with the cordless base station 115, can automatically route a call in process with the PCC 101 between the cordless and the cellular telephone systems when the PCC 101 relocates therebetween.

FIGS. 5A and 5B are flowcharts for the process used by the PCC 101 in FIG. 4. FIG. 6A is a flowchart in the process used by the cordless base station 115 in FIG. 3. In one embodiment of the present invention, the PCC 101 and the cordless base station 115 cooperatively operate, as described in the flowcharts in FIGS. 5A and 5B, and 6A, respectively, to route an incoming call to the cordless telephone system or the cellular telephone system 103 according to the location of the PCC 101.

As shown in FIG. 5A, the PCC 101 may be in an idle state in either the cellular telephone system 103 at block 501 or the cordless telephone system at block 503. In either idle state, the PCC 101 is in a condition to receive an incoming call. For discussion purposes, assume that the PCC 101 is in the idle state in the cellular telephone system 103 at block 501. The PCC 101 decides at block 505 whether to remain in its idle state in the cellular telephone system 103 by returning to block 501 or to change to the cordless telephone system by scanning for an acceptable cordless base station at block 507. If the scan process locates an acceptable cordless base station 115, as determined at block 509, the PCC 101 sends a register message (an attempt by the PCC to register with the cordless base station) to the cordless base station 115 at block 511. Otherwise, the PCC 101 returns to the idle state in the cordless telephone system at block 501.

In FIG. 6A the cordless base station 115 normally waits in an idle state at block 601. Upon receiving the register message at block 603, the cordless base station 115 determines if the PCC 101 is acceptable at block 607. If no register message is received at block 603, the cordless base station 115 returns to its idle state at block 601. If the PCC 101 is acceptable, the cordless base station 115 sends an accept message to the PCC 101, at block 605, sends its own landline telephone number to the PCC 101, at block 611, and returns to its idle state at block 601. If the PCC 101 is not accepted by the cordless base station 115, at block 607, the cordless base station 115 sends a reject message (a nonregistration of the PCC by the cordless base station) to PCC 101 at block 609 and returns to its idle state at block 601.

In FIG. 5A the PCC 101 determines if the accepted (PCC registration) message is received at block 513. If the accepted message is received, the PCC 101 receives the landline telephone number of the cordless base station 115 at block 515. Otherwise, the PCC 101 returns to its idle state in the cellular telephone system 103 at block 501. Thus, the cordless base station 115 has been notified of the PCC's 101 decision to change to the cordless telephone system and the cordless base station 115 responds by giving the PCC 101 its landline telephone number.

In FIG. 5A the PCC 101 determines whether the user's cellular or landline phone number has call routing priority at block 517. Call routing priority refers to the user's system preference (cellular or landline) to which an incoming call is routed to first before transferring to the second system if the PCC 101 is not located. Since the user is available via both a cellular and landline phone number, it would be convenient to give out only one of the phone numbers to another party to place incoming calls to the user. Thus, a single phone number may be used by the other party to reach the user's PCC 101 in either the cellular or cordless telephone system.

If the cellular phone number has call routing priority, the PCC 101 forwards the cellular phone number to the landline phone number of the cordless base unit at block 519 and waits in the idle state in the cordless telephone system at block 503. Thus, an incoming call routed to the user's cellular phone number is automatically forwarded to the landline phone number of the cordless base station 115 when the PCC 101 is located in the cordless telephone system.

If the user's landline phone number has call routing priority, the PCC 101 sends a call forward message to the cordless base unit instructing it to forward the users landline phone number (sent to the cordless base station) to the landline phone number of the cordless base unit at block 521 and waits in the idle state in the cordless telephone system at block 503. In FIG. 6A, if a call forward message is received by the cordless base station 115 at block 613, the cordless base station 115 performs a remote call forwarding of the user's landline phone number to the landline phone number of the cordless base station 115 at block 615 and returns to its idle state at block 601. Thus, an incoming call routed to the user's landline phone number is automatically forwarded to the landline phone number of the cordless base station 115 when the PCC 101 is located in the cordless system. If the PCC 101 is turned off the user may still receive incoming calls via any telephone associated with the phone number of the base station.

In FIG. 5B the PCC 101 decides at block 523 whether to remain in its idle state in the cordless telephone system by returning to block 503 or to change to the cellular telephone system 103 by progressing to block 525. At block 525 the PCC 101 determines whether the cellular phone number of the PCC 101 or the user's landline phone number has call routing priority. If the cellular phone number has call routing priority, the PCC 101 sends a cancel call forwarding message to the cellular system and the PCC 101 returns to waiting in the idle state in the cellular system at block 501. Thus, an incoming call routed to the user's cellular phone number directly calls the PCC 101 located in the cellular telephone system 103.

If the user's landline phone number has call routing priority, the PCC 101 sends a call forwarding message to the cordless base station 115 to forward the user's landline phone number for the cellular phone number of the PCC 101 at block 531. If the PCC 101 is unable to establish communication with the cordless base station 115, the PCC 101 can perform the call forwarding by making a cellular telephone call. Thus, an incoming call routed to the user's landline phone number is forwarded to the cellular phone number of the PCC 101 located in the cellular telephone system 103.

FIGS. 7A and 7B are flowcharts for an alternate process used by the PCC 101 in FIG. 4. FIG. 6B is a continuation of the flowchart in FIG. 6A for the process used by the cordless base station 115 in FIG. 3. In an alternate embodiment of the present invention, the PCC 101 and the cordless base station 115 cooperatively operate, as described in the flowcharts in FIGS. 7A and 7B, and 6B, respectively, to automatically route a call in process (i.e. hand off a call) between the cordless telephone system and the cellular telephone system 103 when the location of PCC 101 moves out of range of the cordless telephone system and is in the coverage area of the cellular telephone system 103, respectively. An advantage of the automatic handoff operation to the user is transparent operation of the PCC 101 between the cordless and cellular telephone systems while the PCC 101 is in a call. Another advantage of the automatic handoff operation to the user is lower cost operation of the cordless telephone service. When the PCC 101 is within range of an acceptable cordless base station 115 the PCC 101 transfers from the cellular telephone system 103 to the cordless telephone system.

As shown in FIG. 7A, the PCC 101 may be in a call in either the cellular telephone system 103 at block 701 or the cordless telephone system at block 703. For discussion purposes, assume that the PCC 101 is in a call in the cellular telephone system 103 at block 701. The PCC 101 decides at block 705 whether to remain in its call state in the cellular telephone system 103 by returning to block 701 or to change to the cordless telephone system by scanning for an acceptable cordless base station 115 at block 707. If the scan process locates an acceptable cordless base station 115, as determined at block 709, the PCC 101 sends a register message to the cordless base station 115 at block 711. Otherwise, the PCC 101 returns to the call state in the cordless telephone system at block 701.

In FIG. 6A the cordless base station 115 normally waits in an idle state at block 601. Upon receiving the register message at block 603, the cordless base station 115 determines if the PCC 101 is acceptable at block 607. If no register message is received at block 603, the cordless base station 115 returns to its idle state at block 601. If the PCC 101 is acceptable, the cordless base station 115 sends an accept message to the PCC 101, at block 605, and sends its own landline telephone number to the PCC 101, at block 611, and returns to its idle state at block 601. If the PCC 101 is not accepted by the cordless base station 115, at block 607, the cordless base station 115 sends a reject message to PCC 101 at block 609 and returns to its idle state at block 601.

In FIG. 7A the PCC 101 determines if the accepted message is received at block 713. If the accepted message is received, the PCC 101 receives the landline telephone number of the cordless base station 115 at block 715. Otherwise, the PCC 101 returns to its call state in the cellular telephone system 103 at block 701. Thus, the cordless base station 115 has been notified of the PCC 101's decision to change to the cordless telephone system and the cordless base station 115 responds by giving the PCC 101 its landline telephone number.

In accordance with the preferred embodiment of the present invention, a call in process between the PCC 101 operating in a cellular telephone system 103 and a calling party is handed off from the cellular telephone system 103 to the cordless telephone system by producing a three way call through the cellular telephone system 103, at block 716, between the PCC 101, the other party and the landline phone number of the cordless base station 115.

In FIG. 6B the cordless base station 115 receives the handoff from cellular to cordless request at block 617 and answers the landline leg of the three way call at block 619 to open communication between the other party and the cordless base station 115. The PCC 101 is now in a cordless phone call with the calling party at block 621. In FIG. 7A the PCC 101 operating in the cellular telephone system 103 ends the cellular leg of the three way call at block 718 to terminate cellular system communication between the PCC 101 and the other party. Thus, a call in process is handed off from the cellular telephone system 103 to the cordless telephone system when the PCC 101 relocates from the cellular telephone system 103 to the cordless telephone system.

In FIG. 7B the PCC 101 decides at block 723 whether to remain in its call state in the cordless telephone system by returning to block 703 or to change to the cellular telephone system 103 by progressing to block 725. At block 725, the PCC 101 operating in a cordless telephone system requests that the cordless base station 115 perform a handoff from the cordless to cellular telephone system 103 by producing a three way call between the PCC 101, the other party and the user's cellular phone number.

In FIG. 6B the cordless base unit determines if the request from the PCC 101 to handoff from the cordless to the cellular telephone system 103 at block 623 is received. If the request is received at block 623, the cordless base unit performs a three way call between the PCC 101 operating in the cellular telephone system 103, the other party and the landline phone number of the cordless base station 115 at block 625. Otherwise, the cordless base station 115 returns to block 621 and remains in the call in the cordless telephone system. In FIG. 7B the PCC 101 answers the cellular leg of the three way call at block 727 to open communication between the PCC 101 operating in the cellular telephone system 103 and the other party. Thus, the PCC 101 is now in a cellular phone call at block 701. In FIG. 6B the cordless base station 115 ends the landline leg of the three way call at block 627 to terminate communication between the calling party and the cordless base station 115 and returns to its idle state at block 601.

The decision to change between the cordless and cellular telephone systems at blocks 505, 523, 705 and 723 may be based on a variety of factors including but not limited to: manually determined user preference, automatic system scanning preference or the radio's received signal quality. The PCC 101 may also scan for a number of cordless base station 115s, at blocks 509 and 709, that are known to be acceptable to the PCC 101. One example of the scanning process performed by the PCC 101 at blocks 507 and 707 is described in copending U.S. patent application Ser. No. {CE00619R}, assigned to the assignee of the present invention and filed on the same date herewith.

Two embodiments of the present invention have been described. In the first embodiment, a radiotelephone arrangement has been described that enables an incoming call to be routed to a PCC 101 located in a cellular or cordless telephone system. In the alternate embodiment, a radiotelephone arrangement has been described that enables a call in process with the PCC 101 to handoff between the cellular and cordless telephone systems when the PCC 101 relocates therebetween. It is contemplated that a radiotelephone arrangement may include both embodiments of the present invention.

When the two embodiments are combined, there are some instances when call forwarding must be changed or cancelled before a three way call can be placed. In one example, the user's landline phone number has call routing priority. The PCC 101 is in a cellular telephone call and the PCC 101 decides to change to the cordless base station 115 connected to the user's landline telephone number. Call forwarding on the user's landline telephone number must be cancelled before a three way call can be placed to include the cordless base station 115. In another example, the user's cellular phone number has call routing priority. The PCC 101 is in a cordless telephone call and the PCC 101 decides to change to the cellular telephone system 103. Call forwarding on the user's cellular telephone number must be cancelled before a three way call can be placed to include the cellular telephone system 103. In addition, call routing may be updated at the conclusion of the call in process. Thus, a single PCC 101 may operate ubiquitously within a cellular and cordless telephone system.

The radiotelephone arrangement is not limited to only cellular and cordless telephone systems. The radiotelephone arrangement may operate in at least two radiotelephone systems where it would be desirable for a PCC 101 to switch between the systems. Such desirable reasons may include but are not limited to coverage area, service cost or service quality.

Since at least two systems coexist (the conventional cellular system and the cordless system) and have overlapping radio coverage, it is important that a priority hierarchy be established. The cordless system is expected to be a lower cost system than the conventional cellular system because it is attached via the user's home landline connection to the TELCO public switched telephone network by conventional wire. It is most likely that the cordless system would be the preferred system when the PCC 101 is within the coverage area of the cordless base station 115. Therefore, in the preferred embodiment, priority is given to the cordless base service. However, the user may select other hierarchy of priority if desired.

The cordless base station 115 transmits an outbound signalling message on a radio channel which is selected to be noninterfering with radio channels in use in the local cellular system 103. This message is similar to that transmitted in the conventional system in that its purpose is to present the identity of the cordless system and aid the PCC 101 in determining its availability. The format of the message outbound from the cordless base station 115 on its signalling channel is shown in FIG. 8. Information is transmitted in NRZ format in which 20 bits of synchronization data bits (SYNCA) are followed by 30 bits of message word (comprising one-fourth the 120 NRZ bits of the entire message) followed by 18 bits of synchronization data bits (SYNCB), then 30 bits of message word. This format is continued for the four word segments to be transmitted. In the preferred embodiment, a continuation of the transmission of the next message word follows the fourth quarter of the message word with a SYNCA synchronization. An alternative embodiment provides a break between message words and their interleaved synchronization bits, thereby making the signalling channel transmissions discontinuous.

Figure 9:
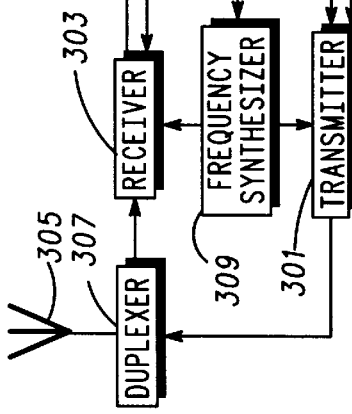
FIG. 9 is a format diagram of an order message and a channel change message which may comprise part of the message stream format of FIG. 8.

Two examples of the format for the message words are shown in FIG. 9. Each message word is transmitted in Manchester format. Since a Manchester bit is comprised of two NRZ bits of opposite state, the 60 Manchester message bits are encoded in 120 NRZ bits. The first message word example is an order message which contains a 32 bit Base IDentification field 901, a Call State field 903, an Order field 905, an Order Qualifier field 907, a field Reserved for future use 909, and a Parity check field 911. A second message word format example is a Channel Change (handoff) message also containing 60 bits. This message word also begins with a Base IDentification 913, a Call State 915, an Order 917, a go-to Channel indication 919, and a 12 bit Parity 921. Each of the word messages has a leading Base IDentification (BID) field which operates in a manner similar to the conventional System IDentification (SID) in use in cellular systems. The BID, however, contains 32 bits rather than the 15 bits in the cellular system. The BID is programmed into the cordless base station memory 315 as a number unique to each cordless base station. This unique BID provides the special characterization of each cordless base station so that a user's PCC 101 and cordless base station 115 will operate together without allowing unauthorized users to obtain access.

In the preferred embodiment, the two bits of the Call State field are designated as follows: "00"—idle, no initialization allowed in the cordless base station; "01"—idle, initialization allowed; "10"—ringing; and "11"—conversation. The 2 bit Order field conveys the following: "00"—extended order and "01"—channel change or handoff. The Order Qualifier field of the order message word is defined as: "00000"—overhead and "00001"—send called address. The two synchronization fields employed in the preferred embodiment are: SYNCA="0100 1001 0101 0110 1101" and SYNCB= "01 0010 0101 0110 1101". Of course, other synchronization patterns may be used as long as they provide adequate cross correlation properties.

To provide better security and interference protection, the BID with the Order Message word is continuously transmitted subaudibly on the voice channel. The PCC 101 receives and decodes the BID and checks for a match between the subaudibly transmitted BID and the BID of its associated cordless base station 115. So long as the BIDs match, the conversation on the voice channel may continue. Upon detection of a mismatch, the PCC 101 received audio is muted and the PCC transmitter 403 is unkeyed. After a predetermined period of improper BID reception by the PCC 101 and a subsequent lack of received transmission from the PCC 101 to the cordless base station 115, the call is terminated.

Given that the priority established for the PCC 101 is that the cordless base station 115 is the first desired path for a user's telephone call and the conventional cellular (or the microcell system) is the second choice, the process of implementing that priority is shown in FIG. 10. The depiction in FIG. 10 is of the PCC receiver's 401 reception of the outbound signalling channel or set of signalling channels transmitted from the cellular system, the cordless base, and the microcellular system relative to time. This diagram aids in the understanding of the unique scanning priority feature of the present invention.

The PCC receiver 401 can be monitoring 1001 the outbound message stream being transmitted from the cellular system signalling channel (which was selected from among the plurality of cellular signalling channels in conventional fashion). At the appropriate time, the PCC receiver 401 is instructed by its microprocessor 409 to tune to the frequency or one of the frequencies being used by the cordless base station 115 as a signalling channel. The PCC receiver 401 scans 1003 the cordless base outbound signalling channel or channels for a period of time $t_2$. If the signalling data stream is not received with sufficient quality, the PCC receiver 401 is retuned to the previously selected signalling channel of the cellular system 103. It remains tuned to this signalling channel 1005 for a period of time, $t_1$, before attempting another scan of a signalling channel of one of the alternative systems. The relationship of $t_1$ and $t_2$ is such that a cellular page message (that is, a radiotelephone call or other transmitted requirement) which is repeated, conventionally, after a 5 second pause will not be missed because the PCC receiver 401 was scanning an alternative system during both cellular page message transmission times. The time $t_1$ must be greater than the sum of the pause between the two pages and the typical time to transmit two pages. The time $t_2$ must be less than the time between the two pages. If the pause time is 5 seconds and the typical time to transmit a page is 185.2 milliseconds, $t_1$ must be greater than the 5.3704 seconds and $t_2$ must be less than 5 seconds. After monitoring the cellular system signalling channel for a time $t_1$, the PCC receiver 401 may be instructed to tune to the signalling channel or to the signalling channels, sequentially, of the microcell system, as shown at 1007. If an adequate microcell signalling channel is not found during the scan of predetermined signalling channel frequencies, the PCC receiver 401 retunes to the cellular system signalling channel, as shown at 1009.

A scan to the signalling channels, 1011, of the cordless base station 115 which discovers a signalling data stream meeting appropriate quality requirements results in the PCC receiver 401 continuing to monitor the cordless signalling channel. The PCC receiver 401 remains on the cordless signalling channel without rescanning to another system until the PCC 101 cannot receive the cordless base's transmitted signal for a continuous 5 second period of time.

The effect of this priority process is to give priority to the cordless base station 115 at the PCC 101. Once the signalling channel of the cordless base station 115 is discovered, the PCC 101 remains tuned to this channel. Thus, when the PCC 101 is initially tuned to the cellular system it will automatically switch to the cordless base station when it is possible to access the cordless base station. Once the PCC receiver 401 has found the cordless base signalling channel, it remains tuned to that channel. When the PCC transceiver is first turned on, its first scan of signalling channels is the preestablished signalling channel or channels of the cordless base station 115. Of course, the user may override the automatic priority scanning hierarchy by entering an override code into the PCC 101. In this manner, the user may force the scanning of the cellular system signalling channels only, the cordless base signalling channels only, the microcellular system signalling channels only, or combinations of the systems. The user may also perform a call origination with a one time override to the system of his choice.

Once the signalling channel of a system is being monitored, a visual indication is given to the PCC transceiver user. In the preferred embodiment, this indicator is a set of light emitting diodes (LEDs) 415, 417, one of which uniquely illuminates to indicate to which system the PCC transceiver is tuned. Other indicators may alternately be used to convey the same information. For example, a system identifier may appear in the number display of the PCC 101, or a flashing symbol (having different rates of flashing) may be used. Nevertheless, this indication enables the user to determine which system he is in and decide whether he wishes to complete a radiotelephone call in the indicated system.

Turning now to FIGS. 11A and 11B, the process followed by the PCC 101 in realizing the scan priority is shown in a flow diagram. This process is executed by the microprocessor 409 from its operating program stored in ROM memory 421. Upon power-on, at 1101, the radio sets the cellular scan counter to 0. This variable is utilized to ensure that excessive word synchronization losses or other reasons for excessive cellular rescans do not prevent the PCC 101 from scanning for the cordless base station 115 channels. After resetting the cellular scan counter, the predetermined signalling channel (or channels) of the cordless base station 115 is scanned at 1103 to determine if the PCC 101 is within range of a cordless base station, whether the signalling channel received has the proper BID, and potentially whether the signalling channel has sufficient signal quality. The PCC 101 decides if all the criteria have been met at 1105. If the criteria have been met, the cordless mode of operation is entered and the user is notified by illumination of the LED associated with the cordless mode, at 1107. The PCC transceiver remains in the mode of processing cordless functions, at 1109, including monitoring the cordless base signalling channel, making and receiving radiotelephone calls, and effecting channel change (handoff) between itself and the cordless base, until synchronization or BID is lost between the PCC 101 transceiver and the cordless base station 115 (as detected at 1111).

If synchronization or BID match becomes lost, the process moves to a check of whether the PCC 101 was engaged in a radiotelephone call, at 1113. If the PCC 101 were not in a call, the process moves into a scan of the cellular system signalling channels; if the PCC 101 were engaged in a call, several attempts are made to reengage the call in the cordless mode. The cordless base scan counter is reset at 1115 and is checked at 1117 to determine if the counter has gone beyond the maximum number of cordless base scans (maximum=2 in the preferred embodiment). The cordless channels are scanned at 1119 as described for 1103 and the results are checked at 1121. If the signalling channel from the cordless base station 115 is found, the cordless phone call is resumed. Otherwise, the cordless base scan counter is incremented at 1123 and is rechecked for exceeding the maximum at 1117. If the cordless base scan counter exceeds the maximum, the PCC 101 will abort the cordless mode and will attempt to scan the signalling channels of the cellular system 103.

The cellular scan is begun with process 1125 which is also entered from test 1105. First, the cordless base rescan timer is reset (set to zero) at 1125 to mark the time of the end of the last cordless communication. The cellular scan counter is incremented (1 is added) at 1127 since a cellular scan is about to begin. The PCC 101 scans the cellular system signalling channels, at 1129, according to conventional user settings.

A test is performed at 1131 to determine if an adequate signalling channel is present in the list of cellular signalling channel frequencies scanned by the PCC 101. If no channel is acceptable, a "no svc" LED is illuminated, at 1133, and the process returns to scan the cordless signalling channels at 1101. If a cellular system signalling channel is found to be acceptable, a LED indicating an in service mode is illuminated and all other service provider LED's are extinguished, at 1135. The cellular rescan timer is reset at 1137 to determine the time at which the last cellular rescan was completed. The process then progresses to the modified cellular system "idle task", 1138.

The idle task, 1138, first determines if it is time for a forced cordless rescan at 1139. A forced cordless rescan occurs if the cordless base rescan timer is greater than CBRT. CBRT is the cordless base rescan timeout and is set to 60 seconds in the preferred embodiment. In order for the forced cordless rescan to occur, the cellular scan counter must exceed the maximum number of consecutive cellular scans which is set to 6 in the preferred embodiment. The forcing of the rescan is done since the PCC 101 could get stuck in an endless loop if the check were not there and the radio continuously acquired the cellular channel and lost word synchronization. If the forced cordless rescan is not necessary, the PCC 101 goes to the test at 1141 to determine if cellular word synchronization is present. If word synchronization is not present, the PCC 101 rescans the cellular system by starting at 1127. The resetting of the cordless base rescan timer at 1125 is skipped since the cordless base was not scanned.

If word synchronization is present, a determination of whether a system access is necessary (that is, a call origination, a call page response, or other directed cellular system access) is made at 1143. If a system access is necessary an attempt is made to conventionally access the cellular system at 1146. A successful access results in a post power on return to the process. An unsuccessful access, such as a reception of a page request but an unsuccessful attempt to respond, as determined at 1148, results in a return to the cellular system signalling channel scan.

If a system access was not deemed necessary at 1143, a test is performed at 1145 to determine if a cellular rescan should occur. A cellular rescan occurs if the cellular rescan timer exceeds 300 seconds and the cordless rescan timer exceeds the minimum rescan time. The minimum rescan time is the minimum value of $t_1$ which was 5.3704 seconds in the earlier example. Performing the test of the cordless rescan timer ensures that the PCC 101 has a chance to receive one of the two potential transmissions of the same page. When a cellular rescan occurs, the PCC 101 goes to 1127 thus skipping the resetting of the cordless base rescan timer at 1125.

If the cellular rescan is not necessary, a test is performed at 1147 to determine if a cordless base rescan should occur. A cordless base rescan occurs if the cordless base rescan timer exceeds CBRT and the cellular rescan timer is greater than the minimum rescan time. The minimum rescan time is 5.3704 seconds. Performing the test of the cellular rescan timer ensures that the PCC 101 has a chance to receive one of the two potential transmissions of the same page. The value of CBRT (cordless base rescan timer) must be greater than $t_1$ which is 5.3704 seconds. A value of 60 seconds is picked for CBRT for the preferred embodiment. If a cordless base rescan is not necessary, the process starts back at the beginning of the idle task, 1138. This is the test at 1139.

If a cordless rescan is necessary, the process begins by resetting the cellular scan counter at 1149. This is also the first state of a forced cellular rescan which is decided at 1139. The cellular scan counter is reset at 1149 to assure that a forced cordless scan is not needlessly decided upon at 1139. After the resetting of the cellular scan counter, the signalling channels of the cordless base station 115 are scanned at 1151 as described for 1103. If the test at 1153 determines that the base was found, the cordless mode is entered and the user is notified at 1107. If the cordless base was not found, the PCC 101 must return to the previous control channel at 1155. It then delays to acquire word synchronization at 1157. The cordless base rescan timer is reset at 1159 to indicate the time that the last cordless base rescan occurred. Finally, the process resumes at the top of the idle task, 1138, at test 1139.

The PCC 101 cooperatively operates with the cordless base station 115 over the local coverage area using cellular frequency channels. Both the PCC 101 and the cordless base station 115 scan the available channels to generate separate priority lists. The PCC 101 and the cordless base station 115 categorize the available channels in its own priority list from best to worst. The priority list from both the PCC 101 and the cordless base station 115 are combined to form a master priority list. The cordless telephone system then assigns the clearest available channel from the master priority list for use in the cordless telephone system. Thus, interference to and from the cellular system and other users of the cellular frequencies is minimized and the need for frequency planning is eliminated.

Figure 12:
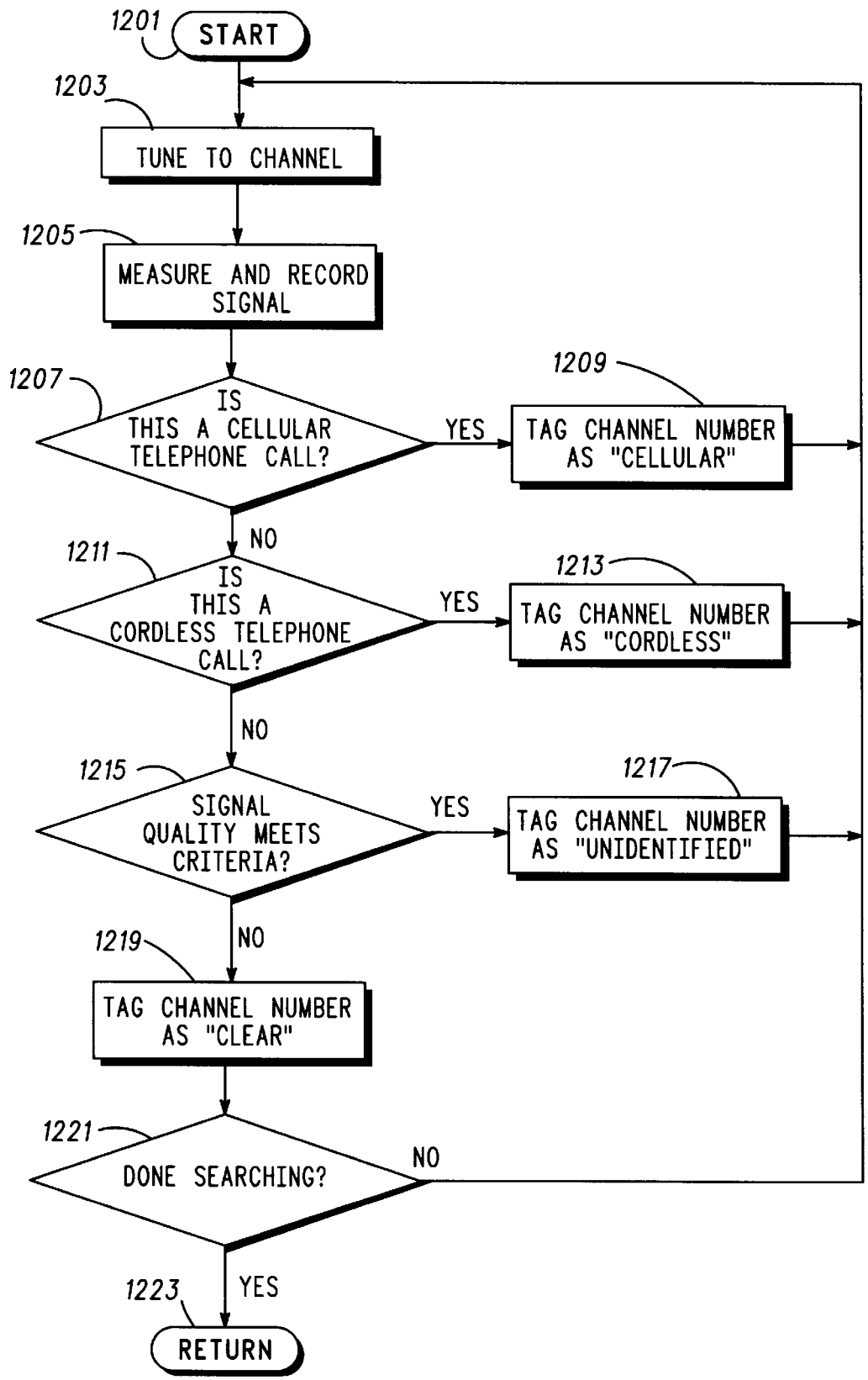
FIG. 12 is a flowchart of the process used in both the cordless base station in FIG. 3 and the PCC in FIG. 4 to tag a selected channel and record the signal quality of the selected channel.

FIG. 12 is a flowchart of the process used in both the cordless base station 115 in FIG. 3 and the PCC 101 in FIG. 4 to tag a selected channel and record the signal quality of the selected channel. For simplicity, only one flowchart is shown. The flow begins at block 1201 and tunes to a cellular channel at block 1203. The signal quality of the channel is measured and recorded at block 1205. At block 1207, a determination is made if there is a cellular telephone call in process on the channel. If the determination is positive, the channel number is tagged as "cellular channel in use" at block 1209 and returns to block 1203 wherein another channel may be tuned to. Knowing the cellular channel is in use is important to the cordless telephone system to avoid interference with the cellular telephone system.

If the determination at block 1207 is negative, a determination is made at block 1211 if there is a cordless telephone call in process on the channel. If the determination is positive, the channel number is tagged as "cordless channel in use" at block 1213 and returns to block 1203 wherein another channel may be tuned to. Knowing that the cordless channel is in use is important to the cordless telephone system to avoid interference with another cordless telephone system.

If the determination at block 1211 is negative, a determination is made at block 1215 if the signal quality of the channel meets a predetermined criteria. For example, the signal strength of the channel may be compared to a predetermined threshold level. Signal strength levels above the threshold are determined to meet the criteria and those below the threshold do not meet the criteria. Channels that are identified as meeting the criteria at block 1215 are tagged "unidentified signal on channel" at block 1217 and returns to block 1203 wherein another channel may be tuned to. Knowing that there is an unidentified signal on the channel is important to the cordless telephone system to avoid interference with another signal source.

If the determination at block 1215 is negative, the channel is tagged "clear channel for use". If the channel scan priority process is complete at block 1221 normal operation is resumed at block 1223. Otherwise, the flow continues to block 1203 to tune to another channel.

The flowchart in FIG. 12 tags a selected channel and records the signal quality of the selected channel. A typical cordless telephone system operates on more than one cellular channel. The flowchart of FIG. 12 is repeated for each of the available cellular channels. After all the channels have been scanned, the cordless base station 115 and the PCC 101 each have a prioritized list of available channels.

The priority list places each selected channel in to one of four categories in order from best to worst as follows: "clear channel for use", "cordless channel in use", "unidentified signal on channel" and "cellular channel in use". Within each category, the selected channels are ranked according to their recorded signal quality measurement.

All the available channels are repeatedly scanned to generate the priority list for the local coverage area. This is advantageous for a PCC 101 that moves within the local coverage area.

The priority list from the cordless base station 115 and the PCC 101 are merged together in the cordless base station 115 to form a master priority list. The master priority list is used by the cordless telephone system to assign a clear channel for use. Each available channel is assigned the lower priority selected from each individual list to form the master priority list.

Periodically, the available channels are again repeatedly scanned to update the priority list. For example, if the result of the first scan process tagged a selected channel "cordless in use" and the same channel is later tagged "clear channel", the selected channel would be moved up in the priority list for use in the cordless telephone system. However, the cellular channels are intermittently used in the cellular telephone system. Thus, a selected channel originally tagged in a low level category must be tagged in a higher level category for a predetermined number of scans before the selected channel can be moved to a higher level category.

We claim:

1. A subscriber unit comprising:

a transceiver for communicating with a first communication system and a second communication system and for scanning frequency channels of the first communication system servicing a wide area at a relatively high power level and for scanning frequency channels of the second communication system servicing a local area at a relatively low power level, wherein at least one of the frequency channels of the second communication system has the same frequency as a frequency channel of the first communication system; and a processor for performing the steps of:

tuning the transceiver to at least one frequency channel of the frequency channels when the subscriber unit is within the local area of the second communication system;

determining a measure of interference on at least one frequency channel of the frequency channels responsive to the step of tuning; and assigning the at least one frequency channel of the frequency channels of the first communication system to the transceiver for communicating with the second communication system when the subscriber unit is within the local area of the second communication system responsive the step of determining.

2. A subscriber unit according to claim 1 wherein the subscriber unit is a portable cellular cordless unit.

3. A subscriber unit according to claim 1 wherein the subscriber unit is a cordless base unit.

4. A subscriber unit according to claim 1 wherein the processor further performs the step of:

ranking the at least one frequency channel of the frequency channels responsive to the step of determining, wherein the processor further assigns the at least one frequency channel of the frequency channels of the first communication system to the transceiver for communicating with the second communication system when the subscriber unit is within the local area of the second communication system responsive the step of ranking.

5. A subscriber unit according to claim 1 wherein the step of determining a measure of interference further comprises the step of measuring the quality of a signal on the at least one frequency channel of the frequency channels.

6. A subscriber unit according to claim 5 wherein the signal quality further comprises signal magnitude.

7. A subscriber unit comprising:

a transceiver for scanning frequency channels of a first communication system servicing a wide area at a relatively high power level and for scanning frequency channels of a second communication system servicing a local area at a relatively low power level, wherein at least one of the frequency channels of the second communication system has the same frequency as a frequency channel of the first communication system; and a processor for performing the steps of:

tuning the transceiver to at least one frequency channel of the frequency channels when the subscriber unit is within the local area of the second communication system;

determining a type of service operating on at least one frequency channel of the frequency channels responsive to the step of tuning; and assigning the at least one frequency channel of the frequency channels of the first communication system to the transceiver for communicating with the second communication system when the subscriber unit is within the local area of the second communication system responsive the step of determining.

8. A subscriber unit according to claim 7 wherein the subscriber unit is a portable cellular cordless unit.

9. A subscriber unit according to claim 7 wherein the subscriber unit is a cordless base unit.

10. A subscriber unit according to claim 7 wherein the type of service comprises at least one of cellular radiotelephone service and cordless radiotelephone service.

11. A subscriber unit according to claim 7 wherein the processor further performs the step of:

ranking the at least one frequency channel of the frequency channels responsive to the step of determining, wherein the processor further assigns the at least one frequency channel of the frequency channels of the first communication system to the transceiver for communicating with the second communication system when the subscriber unit is within the local area of the second communication system responsive the step of ranking.

12. A communication system having a predetermined set of frequency channels for servicing a first coverage area, comprising:

first means for receiving at least a first set of channels of the predetermined set of frequency channels within a second coverage area;

means for determining a type of service operating on each frequency channel of the first set of frequency channels;

means for determining a measure of interference on each frequency channel of the first set of frequency channels; and means for sorting the first set of frequency channels responsive to the determined type of service operating on each frequency channel of the first set of frequency channels and the determined measure of interference on each frequency channel of the first set of frequency channels to produce a first list of frequency channels for use within the second coverage area.

13. A communication system according to claim 12 wherein means for sorting further comprises means for ranking each frequency channel of the first set of frequency channels according to the determined type of service operating on the first set of frequency channels and the determined measure of interference on the first set of frequency channels within each determined type of service.

14. A communication system according to claim 12 further comprising:

second means for receiving at least a second set of channels of the predetermined set of frequency channels within the second coverage area;

means for determining a type of service operating on each frequency channel of the second set of frequency channels;

means for determining a measure of interference on each frequency channel of the second set of frequency channels;

means for sorting the second set of frequency channels responsive to the determined type of service operating on each frequency channel of the second set of frequency channels and the determined measure of interference on each frequency channel of the second set of frequency channels to produce a second list of frequency channels for use within the second coverage area; and means for combining the first list of frequency channels and the second list of frequency channels to produce a master list of frequency channels for use within the second coverage area.

15. A communication system according to claim 14 wherein means for sorting further comprises means for ranking each frequency channel of the second set of frequency channels according to the determined type of service operating on the second set of frequency channels and the determined measure of interference on the second set of frequency channels within each determined type of service.

16. A cellular communication system having a predetermined set of frequency channels for servicing a wide coverage area, comprising:

a cordless communication system, including a portable unit and a base station unit, for servicing a limited coverage area;

the portable unit including:

means for receiving at least a first set of channels of the predetermined set of frequency channels within the limited coverage area;

means for determining a type of service operating on each frequency channel of the first set of frequency channels;

means for determining a measure of interference on each frequency channel of the first set of frequency channels; and means for sorting the first set of frequency channels responsive to the determined type of service operating on each frequency channel of the first set of frequency channels and the determined measure of interference on each frequency channel of the first set of frequency channels to produce a first list of frequency channels;

the base station unit including:

means for receiving at least a second set of channels of the predetermined set of frequency channels within the limited coverage area;

means for determining a type of service operating on each frequency channel of the second set of frequency channels;

means for determining a measure of interference on each frequency channel of the second set of frequency channels; and means for sorting the second set of frequency channels responsive to the determined type of service operating on each frequency channel of the second set of frequency channels and the determined measure of interference on each frequency channel of the second set of frequency channels to produce a second list of frequency channels; and means for combining the first list of frequency channels and the second list of frequency channels to produce a master list of frequency channels for use by the cordless communication system.

17. A communication system comprising:

a first communication system having frequency channels for servicing a first coverage area at a relatively high power level;

a second communication system having frequency channels for servicing a second coverage area at a relatively low power level, wherein at least one of the frequency channels of the second communication system has the same frequency as a frequency channel of the first communication system; and a subscriber unit comprising:

a transceiver for communicating with the first communication system and the second communication system and for scanning the frequency channels of the first communication system and for scanning the frequency channels of the second communication system; and a processor for performing the steps of:

tuning the transceiver to at least one frequency channel of the frequency channels when the subscriber unit is within the second area of the second communication system;

determining a measure of interference on at least one frequency channel of the frequency channels responsive to the step of tuning; and assigning the at least one frequency channel of the frequency channels of the first communication system to the transceiver for communicating with the second communication system when the subscriber unit is within the second area of the second communication system responsive the step of determining.

18. A communication system according to claim 17 wherein the step of determining a measure of interference further comprises the step of measuring the quality of a signal on the at least one frequency channel of the frequency channels.

19. A communication system according to claim 17 wherein the processor further performs the step of:

ranking the at least one frequency channel of the frequency channels responsive to the step of determining, wherein the processor further assigns the at least one frequency channel of the frequency channels of the first communication system to the transceiver for communicating with the second communication system when the subscriber unit is within the second area of the second communication system responsive the step of ranking.

20. A communication system comprising:

a first communication system having frequency channels for servicing a first coverage area at a relatively high power level;

a second communication system having frequency channels for servicing a second coverage area at a relatively low power level, wherein at least one of the frequency channels of the second communication system has the same frequency as a frequency channel of the first communication system; and a subscriber unit comprising:

a transceiver for scanning the frequency channels of the first communication system and for scanning the frequency channels of the second communication system; and a processor for performing the steps of:

tuning the transceiver to at least one frequency channel of the frequency channels when the subscriber unit is within the second area of the second communication system;

determining a type of service operating on at least one frequency channel of the frequency channels responsive to the step of tuning; and assigning the at least one frequency channel of the frequency channels of the first communication system to the transceiver for communicating with the second communication system when the subscriber unit is within the second area of the second communication system responsive the step of determining.

21. A communication system according to claim 20 wherein the type of service comprises at least one of cellular radiotelephone service and cordless radiotelephone service.

22. A communication system according to claim 20 wherein the processor further performs the step of:

ranking the at least one frequency channel of the frequency channels responsive to the step of determining, wherein the processor further assigns the at least one frequency channel of the frequency channels of the first communication system to the transceiver for communicating with the second communication system when the subscriber unit is within the second area of the second communication system responsive the step of ranking.

23. A communication system comprising:

a first communication system having a predetermined set of frequency channels for servicing a first coverage area;

a second communication system for servicing a second coverage area;

first means for receiving at least a first set of channels of the predetermined set of frequency channels within the second coverage area;

means for determining a type of service operating on each frequency channel of the first set of frequency channels;

means for determining a measure of interference on each frequency channel of the first set of frequency channels; and means for sorting the first set of frequency channels responsive to the determined type of service operating on each frequency channel of the first set of frequency channels and the determined measure of interference on each frequency channel of the first set of frequency channels to produce a first list of frequency channels for use by the second communication system.

24. A communication system according to claim 23 wherein means for sorting further comprises means for ranking each frequency channel of the first set of frequency channels responsive to the determined type of service operating on the first set of frequency channels and the determined measure of interference on the first set of frequency channels within each determined type of service.

25. A communication system according to claim 23 further comprising second means for receiving at least a second set of channels of the predetermined set of frequency channels within the second coverage area;

means for determining a type of service operating on each frequency channel of the second set of frequency channels;

means for determining a measure of interference on each frequency channel of the second set of frequency channels;

means for sorting the second set of frequency channels responsive to the determined type of service operating on each frequency channel of the second set of frequency channels and the determined measure of interference on each frequency channel of the second set of frequency channels to produce a second list of frequency channels for use by the second communication system; and means for combining the first list of frequency channels and the second list of frequency channels to produce a master list of frequency channels for use by the second communication system.

26. A communication system according to claim 25 wherein means for sorting further comprises means for ranking each frequency channel of the second set of frequency channels responsive to the determined type of service operating on the second set of frequency channels and the determined measure of interference on the second set of frequency channels within each determined type of service.

27. A communication system comprising:

a cellular communication system having a predetermined set of frequency channels for servicing a wide coverage area;

a cordless communication system, including a portable unit and a base station unit, for servicing a limited coverage area;

the portable unit including:

means for receiving at least a first set of channels of the predetermined set of frequency channels within the limited coverage area;

means for determining a type of service operating on each frequency channel of the first set of frequency channels;

means for determining a measure of interference on each frequency channel of the first set of frequency channels; and means for sorting the first set of frequency channels responsive to the determined type of service operating on each frequency channel of the first set of frequency channels and the determined measure of interference on each frequency channel of the first set of frequency channels to produce a first list of frequency channels;

the base station unit including:

means for receiving at least a second set of channels of the predetermined set of frequency channels within the limited coverage area;

means for determining a type of service operating on each frequency channel of the second set of frequency channels;

means for determining a measure of interference on each frequency channel of the second set of frequency channels; and means for sorting the second set of frequency channels responsive to the determined type of service operating on each frequency channel of the second set of frequency channels and the determined measure of interference on each frequency channel of the second set of frequency channels to produce a second list of frequency channels; and means for combining the first list of frequency channels and the second list of frequency channels to produce a master list of frequency channels for use by the second communication system.

28. A communication apparatus comprising:

a transceiver for alternatively communicating on:

at least one frequency channel of frequency channels of a first communication system servicing a first area; and at least one frequency channel of frequency channels of a second communication system servicing a second area responsive to a determined a measure of interference on at least one frequency channel of the frequency channels of the second communication system when the transceiver is within the second area of the second communication system, wherein at least one of the frequency channels of the second communication system has the same frequency as a frequency channel of the first communication system.

29. A communication apparatus comprising:

a transceiver for alternatively communicating on:
   at least one frequency channel of frequency channels of a first communication system servicing a first area; and
   at least one frequency channel of frequency channels of a second communication system servicing a second area responsive to a determined type of service operating on at least one frequency channel of the frequency channels of the second communication system when the transceiver is within the second area of the second communication system, wherein at least one of the frequency channels of the second communication system has the same frequency as a frequency channel of the first communication system.

30. A communication apparatus comprising:

a portable subscriber unit comprising:
   a transceiver for communicating with a first communication system and a second communication system and for scanning frequency channels of the first communication system servicing a wide area at a relatively high power level and for scanning frequency channels of the second communication system servicing a local area at a relatively low power level, wherein at least one of the frequency channels of the second communication system has the same frequency as a frequency channel of the first communication system; and
   a processor for performing the steps of:
      tuning the transceiver to at least one frequency channel of the frequency channels when the portable subscriber unit is within the local area of the second communication system;
      determining a measure of interference on at least one frequency channel of the frequency channels responsive to the step of tuning; and
      sorting frequency channels of the frequency channels responsive to the step of determining to produce a first list of frequency channels for use by the transceiver for communicating with the second communication system when the portable subscriber unit is within the local area of the second communication system.

31. A communication system according to claim 30 further comprising:

a base subscriber unit comprising:
   a transceiver for scanning frequency channels of the first communication system and for scanning frequency channels of the second communication system; and
   a processor for performing the steps of:
      tuning the transceiver to at least one frequency channel of the frequency channels when the base subscriber unit is within the local area of the second communication system;
      determining a measure of interference on at least one frequency channel of the frequency channels responsive to the step of tuning; and
      sorting frequency channels of the frequency channels responsive to the step of determining to produce a second list of frequency channels for use by the transceiver for communicating with the second communication system when the base subscriber unit is within the local area of the second communication system;

wherein the first list of frequency channels and the second list of frequency channels are combined within at least one of the processor of the portable subscriber unit and the processor of the base subscriber unit to produce a combined list of frequency channels; and wherein the at least one of the processor of the portable subscriber unit and the processor of the base subscriber unit assigns at least one frequency channel of the frequency channels from the combined list of frequency channels to the transceiver of the portable subscriber unit and the transceiver of the base subscriber unit for communicating in the second communication system.

32. A method of operating subscriber unit which communicates with a first communication system and a second communication system, the method comprising the steps of:

scanning frequency channels of the first communication system servicing a wide area at a relatively high power level;

scanning frequency channels of the second communication system servicing a local area at a relatively low power level, wherein at least one of the frequency channels of the second communication system has the same frequency as a frequency channel of the first communication system;

tuning a transceiver to at least one frequency channel of the frequency channels when the subscriber unit is within the local area of the second communication system;

determining a measure of interference on at least one frequency channel of the frequency channels responsive to the step of tuning; and assigning the at least one frequency channel of the frequency channels of the first communication system to the transceiver for communicating with the second communication system when the subscriber unit is within the local area of the second communication system responsive the step of determining.

33. A method according to claim 32 wherein the subscriber unit is a portable unit.

34. A method according to claim 32 wherein the subscriber unit is a portable unit.

35. A method according to claim 32 wherein the step of determining a measure of interference further comprises the step of measuring the quality of a signal on the at least one frequency channel of the frequency channels.

36. A method according to claim 32 further comprising the step of:

ranking the at least one frequency channel of the frequency channels responsive to the step of determining, wherein the step of assigning further assigns the at least one frequency channel of the frequency channels of the first communication system to the transceiver for communicating with the second communication system when the subscriber unit is within the local area of the second communication system responsive the step of ranking.

37. A method of operating a subscriber unit comprising the steps of:

scanning frequency channels of a first communication system servicing a wide area at a relatively high power level;

scanning frequency channels of a second communication system servicing a local area at a relatively low power level, wherein at least one of the frequency channels of the second communication system has the same frequency as a frequency channel of the first communication system;

tuning the transceiver to at least one frequency channel of the frequency channels when the subscriber unit is within the local area of the second communication system;

determining a type of service operating on at least one frequency channel of the frequency channels responsive to the step of tuning; and assigning the at least one frequency channel of the frequency channels of the first communication system to the transceiver for communicating with the second communication system when the subscriber unit is within the local area of the second communication system responsive the step of determining.

38. A method according to claim 37 wherein the subscriber unit is a portable unit.

39. A method according to claim 37 wherein the subscriber unit is a base unit.

40. A method according to claim 37 wherein the type of service comprises at least one of cellular radiotelephone service and cordless radiotelephone service.

41. A method according to claim 37 further comprising the step of:

ranking the at least one frequency channel of the frequency channels responsive to the step of determining, wherein the step of assigning further assigns the at least one frequency channel of the frequency channels of the first communication system to the transceiver for communicating with the second communication system when the subscriber unit is within the local area of the second communication system responsive the step of ranking.

42. A method for operating a communication system having a predetermined set of frequency channels for servicing a first coverage area, comprising the steps of:

receiving at least a first set of channels of the predetermined set of frequency channels within a second coverage area;

determining a type of service operating on each frequency channel of the first set of frequency channels;

determining a measure of interference on each frequency channel of the first set of frequency channels; and sorting the first set of frequency channels responsive to the determined type of service operating on each frequency channel of the first set of frequency channels and the determined measure of interference on each frequency channel of the first set of frequency channels to produce a first list of frequency channels for use within the second coverage area.

43. A method according to claim 42 wherein step of sorting further comprises the step of ranking each frequency channel of the first set of frequency channels according to the determined type of service operating on the first set of frequency channels and the determined measure of interference on the first set of frequency channels within each determined type of service.

44. A method according to claim 42 further comprising the steps of:

receiving at least a second set of channels of the predetermined set of frequency channels within the second coverage area;

determining a type of service operating on each frequency channel of the second set of frequency channels;

determining a measure of interference on each frequency channel of the second set of frequency channels;

sorting the second set of frequency channels responsive to the determined type of service operating on each frequency channel of the second set of frequency channels and the determined measure of interference on each frequency channel of the second set of frequency channels to produce a second list of frequency channels for use within the second coverage area; and combining the first list of frequency channels and the second list of frequency channels to produce a master list of frequency channels for use within the second coverage area.

45. A method according to claim 44 wherein step of sorting further comprises the step of ranking each frequency channel of the second set of frequency channels according to the determined type of service operating on the second set of frequency channels and the determined measure of interference on the second set of frequency channels within each determined type of service.

46. A method of operating a cellular communication system having a predetermined set of frequency channels for servicing a wide coverage area, comprising the steps of:

operating a cordless communication system, including a portable unit and a base station unit, for servicing a limited coverage area;

the portable unit performing the steps of:

receiving at least a first set of channels of the predetermined set of frequency channels within the limited coverage area;

determining a type of service operating on each frequency channel of the first set of frequency channels;

determining a measure of interference on each frequency channel of the first set of frequency channels; and sorting the first set of frequency channels responsive to the determined type of service operating on each frequency channel of the first set of frequency channels and the determined measure of interference on each frequency channel of the first set of frequency channels to produce a first list of frequency channels;

the base station unit performing the steps of:

receiving at least a second set of channels of the predetermined set of frequency channels within the limited coverage area;

determining a type of service operating on each frequency channel of the second set of frequency channels;

determining a measure of interference on each frequency channel of the second set of frequency channels; and sorting the second set of frequency channels responsive to the determined type of service operating on each frequency channel of the second set of frequency channels and the determined measure of interference on each frequency channel of the second set of frequency channels to produce a second list of frequency channels; and combining the first list of frequency channels and the second list of frequency channels to produce a master list of frequency channels for use by the cordless communication system.

47. A method of operating a communication system comprising the steps of:

operating a first communication system having frequency channels for servicing a first coverage area at a relatively high power level;

operating a second communication system having frequency channels for servicing a second coverage area at a relatively low power level, wherein at least one of the frequency channels of the second communication system has the same frequency as a frequency channel of the first communication system; and operating a subscriber unit which communicates with a first communication system and a second communication system comprising the steps of:

scanning frequency channels of the first communication system;

scanning frequency channels of the second communication system;

tuning a transceiver to at least one frequency channel of the frequency channels when the subscriber unit is within the local area of the second communication system;

determining a measure of interference on at least one frequency channel of the frequency channels responsive to the step of tuning; and assigning the at least one frequency channel of the frequency channels of the first communication system to the transceiver for communicating with the second communication system when the subscriber unit is within the local area of the second communication system responsive the step of determining.

48. A method according to claim 47 wherein the step of determining a measure of interference further comprises the step of measuring the quality of a signal on the at least one frequency channel of the frequency channels.

49. A method according to claim 47 further comprising the step of:

ranking the at least one frequency channel of the frequency channels responsive to the step of determining, wherein the step of assigning further assigns the at least one frequency channel of the frequency channels of the first communication system to the transceiver for communicating with the second communication system when the subscriber unit is within the local area of the second communication system responsive the step of ranking.

50. A method of operating a communication system comprising the steps of:

operating a first communication system having frequency channels for servicing a first coverage area at a relatively high power level;

operating a second communication system having frequency channels for servicing a second coverage area at a relatively low power level, wherein at least one of the frequency channels of the second communication system has the same frequency as a frequency channel of the first communication system; and operating a subscriber unit comprising the steps of:

scanning frequency channels of the first communication system;

scanning frequency channels of the second communication system;

tuning a transceiver to at least one frequency channel of the frequency channels when the subscriber unit is within the local area of the second communication system;

determining a type of service operating on at least one frequency channel of the frequency channels responsive to the step of tuning; and assigning the at least one frequency channel of the frequency channels of the first communication system to the transceiver for communicating with the second communication system when the subscriber unit is within the local area of the second communication system responsive the step of determining.

51. A method according to claim 50 wherein the type of service comprises at least one of cellular radiotelephone service and cordless radiotelephone service.

52. A method according to claim 50 further comprising the step of: ranking the at least one frequency channel of the frequency channels responsive to the step of determining, wherein the step of assigning further assigns the at least one frequency channel of the frequency channels of the first communication system to the transceiver for communicating with the second communication system when the subscriber unit is within the local area of the second communication system responsive the step of ranking.

53. A method of operating a communication system comprising the steps of:

operating a first communication system having a predetermined set of frequency channels for servicing a first coverage area;

operating a second communication system for servicing a second coverage area;

receiving at least a first set of channels of the predetermined set of frequency channels within the second coverage area;

determining a type of service operating on each frequency channel of the first set of frequency channels;

determining a measure of interference on each frequency channel of the first set of frequency channels; and sorting the first set of frequency channels responsive to the determined type of service operating on each frequency channel of the first set of frequency channels and the determined measure of interference on each frequency channel of the first set of frequency channels to produce a first list of frequency channels for use by the second communication system.

54. A method according to claim 53 wherein the step of sorting further comprises the step of ranking each frequency channel of the first set of frequency channels responsive to the determined type of service operating on the first set of frequency channels and the determined measure of interference on the first set of frequency channels within each determined type of service.

55. A method according to claim 53 further comprising the steps of:

receiving at least a second set of channels of the predetermined set of frequency channels within the second coverage area;

determining a type of service operating on each frequency channel of the second set of frequency channels;

determining a measure of interference on each frequency channel of the second set of frequency channels;

sorting the second set of frequency channels responsive to the determined type of service operating on each frequency channel of the second set of frequency channels and the determined measure of interference on each frequency channel of the second set of frequency channels to produce a second list of frequency channels for use by the second communication system; and combining the first list of frequency channels and the second list of frequency channels to produce a master list of frequency channels for use by the second communication system.

56. A method according to claim 55 wherein the step of sorting further comprises the step of ranking each frequency channel of the second set of frequency channels responsive to the determined type of service operating on the second set of frequency channels and the determined measure of interference on the second set of frequency channels within each determined type of service.

57. A method of operating a communication system comprising the steps of:

operating a cellular communication system having a predetermined set of frequency channels for servicing a wide coverage area;

operating a cordless communication system, including a portable unit and a base station unit, for servicing a limited coverage area;

the portable unit performing the steps of:
receiving at least a first set of channels of the predetermined set of frequency channels within the limited coverage area;
determining a type of service operating on each frequency channel of the first set of frequency channels;
determining a measure of interference on each frequency channel of the first set of frequency channels; and
sorting the first set of frequency channels responsive to the determined type of service operating on each frequency channel of the first set of frequency channels and the determined measure of interference on each frequency channel of the first set of frequency channels to produce a first list of frequency channels;

the base station unit performing the steps of:
receiving at least a second set of channels of the predetermined set of frequency channels within the limited coverage area;
determining a type of service operating on each frequency channel of the second set of frequency channels;
determining a measure of interference on each frequency channel of the second set of frequency channels; and
sorting the second set of frequency channels responsive to the determined type of service operating on each frequency channel of the second set of frequency channels and the determined measure of interference on each frequency channel of the second set of frequency channels to produce a second list of frequency channels; and combining the first list of frequency channels and the second list of frequency channels to produce a master list of frequency channels for use by the second communication system.

58. A method of operating a communication apparatus comprising the step of:

alternatively communicating, by a transceiver, on:
at least one frequency channel of frequency channels of a first communication system servicing a first area; and
at least one frequency channel of frequency channels of a second communication system servicing a second area responsive to a determined a measure of interference on at least one frequency channel of the frequency channels of the second communication system when the transceiver is within the second area of the second communication system, wherein at least one of the frequency channels of the second communication system has the same frequency as a frequency channel of the first communication system.

59. A method of operating a communication apparatus comprising the step of:

alternatively communicating, by a transceiver, on:
at least one frequency channel of frequency channels of a first communication system servicing a first area; and
at least one frequency channel of frequency channels of a second communication system servicing a second area responsive to a determined type of service operating on at least one frequency channel of the frequency channels of the second communication system when the transceiver is within the second area of the second communication system, wherein at least one of the frequency channels of the second communication system has the same frequency as a frequency channel of the first communication system.

60. A method of operating a communication system having a predetermined set of frequency channels for servicing a subscriber unit which communicates with a first communication system in a first coverage area, the method comprising the steps of:

receiving at least a first set of frequency channels of the predetermined set of frequency channels within a second coverage area;

determining a measure of interference on each frequency channel of the first set of frequency channels; and sorting the first set of frequency channels responsive to the determined measure of interference on each frequency channel of the first set of frequency channels to produce a first list of frequency channels for the subscriber unit to communicate with a second communication within the second coverage area.

61. A method according to claim 60 further comprising the steps of:

receiving at least a second set of frequency channels of the predetermined set of frequency channels within the second coverage area;

determining a measure of interference on each frequency channel of the second set of frequency channels;

sorting the second set of frequency channels responsive to the determined measure of interference on each frequency channel of the second set of frequency channels to produce a second list of frequency channels for use within the second coverage area; and combining the first list of frequency channels and the second list of frequency channels to produce a master list of frequency channels for use within the second coverage area.

* * * * *